(12) United States Patent
Marchisio et al.

(10) Patent No.: US 9,147,132 B2
(45) Date of Patent: Sep. 29, 2015

(54) CLASSIFICATION OF LAND BASED ON ANALYSIS OF REMOTELY-SENSED EARTH IMAGES

(71) Applicant: DigitalGlobe, Inc., Longmont, CO (US)

(72) Inventors: Giovanni B. Marchisio, Longmont, CO (US); Carsten Tusk, Longmont, CO (US); Krzysztof Koperski, Longmont, CO (US); Mark D. Tabb, Longmont, CO (US); Jeffrey D. Shafer, Longmont, CO (US)

(73) Assignee: DigitalGlobe, Inc., Longmont, CO (US)

( * ) Notice: Subject to any disclaimer, the term of this patent is extended or adjusted under 35 U.S.C. 154(b) by 98 days.

(21) Appl. No.: 14/024,418

(22) Filed: Sep. 11, 2013

(65) Prior Publication Data

US 2015/0071528 A1    Mar. 12, 2015

(51) Int. Cl.
*G06K 9/00* (2006.01)
*G06K 9/62* (2006.01)
*G06F 17/30* (2006.01)
*G06K 9/46* (2006.01)

(52) U.S. Cl.
CPC ........ *G06K 9/6269* (2013.01); *G06F 17/30241* (2013.01); *G06K 9/4604* (2013.01); *G06K 9/4642* (2013.01)

(58) Field of Classification Search
CPC ................................................. G06F 17/30241
See application file for complete search history.

(56) References Cited

U.S. PATENT DOCUMENTS

| | | | |
|---|---|---|---|
| 2005/0175253 A1* | 8/2005 | Li et al. | 382/260 |
| 2006/0245631 A1* | 11/2006 | Levenson et al. | 382/133 |
| 2008/0089577 A1 | 4/2008 | Wang | |
| 2009/0220153 A1* | 9/2009 | Hall et al. | 382/181 |
| 2009/0251472 A1* | 10/2009 | Antoine | 345/502 |
| 2012/0062740 A1* | 3/2012 | Treado et al. | 348/144 |
| 2012/0183225 A1* | 7/2012 | Pal et al. | 382/195 |
| 2015/0036939 A1* | 2/2015 | Cordara et al. | 382/201 |

FOREIGN PATENT DOCUMENTS

EP          1846869 B1    10/2011

OTHER PUBLICATIONS

Marchisio, Giovanni, Fabio Pacifici, and Christopher Padwick. "On the relative predictive value of the new spectral bands in the WorldWiew-2 sensor." IGARSS. 2010.*

(Continued)

*Primary Examiner* — Bhavesh Mehta
*Assistant Examiner* — Sean Conner
(74) *Attorney, Agent, or Firm* — Marsh Fischmann & Breyfogle LLP

(57) ABSTRACT

Land classification based on analysis of image data. Feature extraction techniques may be used to generate a feature stack corresponding to the image data to be classified. A user may identify training data from the image data from which a classification model may be generated using one or more machine learning techniques applied to one or more features of the image. In this regard, the classification module may in turn be used to classify pixels from the image data other than the training data. Additionally, quantifiable metrics regarding the accuracy and/or precision of the models may be provided for model evaluation and/or comparison. Additionally, the generation of models may be performed in a distributed system such that model creation and/or application may be distributed in a multi-user environment for collaborative and/or iterative approaches.

37 Claims, 13 Drawing Sheets

(56) References Cited

OTHER PUBLICATIONS

Aksoy, Selim, et al. "Interactive training of advanced classifiers for mining remote sensing image archives." Proceedings of the tenth ACM SIGKDD international conference on Knowledge discovery and data mining. ACM, 2004.*

Aksoy, Selim, et al. "Learning Bayesian classifiers for scene classification with a visual grammar." Geoscience and Remote Sensing, IEEE Transactions on 43.3 (2005): 581-589.*

Pesaresi, Martino, and Jon Atli Benediktsson. "A new approach for the morphological segmentation of high-resolution satellite imagery." Geoscience and Remote Sensing, IEEE Transactions on 39.2 (2001): 309-320.*

PCT/US2014/053387 Search Report and Written Opinion from the International Searching Authority, Dec. 12, 2014, 13 pages.

Goldstein, Tom and Osher, Stanley, The Split Bregman Method for L1 Regularized Problems, available at ftp://ftp.math.ucla.edu/pub/camreport/cam08-29.pdf.

Dalal, Navneet and Triggs, Bill, Histograms of Oriented Gradients for Human Detection, International Conference on Computer Vision and Pattern Recognition, (2005).

Hall-Beyer, The GLCM Tutorial Home Page, Version 2.10 available at http://www.fp.ucalgary.ca/mhallbey/tutorial.htm.

* cited by examiner

CLASSIFICATION OF LAND BASED ON ANALYSIS OF REMOTELY-SENSED EARTH IMAGES

BACKGROUND

The use of geospatial imagery has increased in recent years and represents a significant tool that may be utilized in a number of contexts. As such, high quality geospatial imagery has become increasingly valuable. For example, a variety of different entities (e.g., individuals, governments, corporations, or others) may utilize geospatial imagery (e.g., satellite imagery) for a multitude of applications in a variety of contexts.

With increasingly capable satellites being commissioned and launched, very high resolution (VHR) remotely-sensed multispectral Earth imagery has become increasingly available and useable. For example, as the number of satellite image acquisition systems in operation grows, acquisition ability and flexibility improves. In an example, DigitalGlobe, Inc. of Longmont, Colo. currently operates a number of satellites including, IKONOS, GeoEye-1, QuickBird, WorldView 1, and WorldView 2, with an anticipated launch of WorldView 3. Accordingly, around the clock global coverage may be achieved though the satellite constellation currently in operation. As such, the DigitalGlobe constellation of satellites can image the entire Earth's landmass every 75 days and may capture over six times the Earth's landmass every year with a capacity to collect at least 2.6 million square kilometers of imagery a day. With selective tasking, DigitalGlobe's satellite constellation may quickly and continually collect imagery from targeted locations to provide near real time feedback on global events or the like.

Furthermore, the resolution of image acquisition satellites also continues to increase. For instance, currently operated satellites may have a maximum spatial resolution of 50 cm (wherein each pixel in the resulting images acquired corresponds with the distance measure of the spatial resolution). Additionally, planned satellite launches may provide even greater resolution capabilities with spatial resolutions as high as about 30 cm.

In this light, the amount and quality of VHR remotely-sensed multispectral Earth imagery continues to increase as does the amount and types of image data collected. Accordingly, the nature of the VHR remotely-sensed multispectral Earth imagery may facilitate uses beyond simply providing pixels as image data. For instance, higher level data processing may be applied to the images to, for example, identify objects, identify textures, or otherwise extract useful data from the raw image data. One such application has been in land use identification and land classification, whereby remotely-sensed images are analyzed to categorize pixels of an image into a category of land use or land class. However, as the amount of image data that is available grows and the nature of the image data acquired changes and is improved, advanced image data processing and image analytics are needed to keep pace with the advances in image acquisition technology to facilitate new techniques applied to acquired images to expand the number of applications for which such technology may be used.

SUMMARY

In this regard, the present disclosure generally relates to land classification using very high resolution (VHR) remotely-sensed multispectral Earth images. VHR imagery may comprise remotely sensed imagery with a resolution not less that about 20 m, not less than about 10 m, not less than about 5 m, or even not less than about 1 m. In this regard and in some embodiments, VHR imagery may make a resolution as high as 0.50 m or greater. Specifically, the present disclosure provides approaches that may leverage the capability of increasingly powerful and versatile satellite constellations and other image acquisition techniques to provide for improved land classification in an increasing number of contexts. In this regard, at least some of the aspects disclosed herein may be particularly suited for application to images acquired using multispectral images including, for example, eight or more multispectral bands that are leveraged to provide robust land classification.

Additionally, the present disclosure may provide a multi-user environment that allows for collaboration to develop land classification information and/or classification models for use in determining land classifications. As one goal for land classification is to generate a global land classification layer, the present disclosure may provide architecture that facilitates collaborative, incremental generation of classification models to provide worldwide land classification in a manageable, efficient manner using a modular, scalable, and/or collaborative architecture. As such, the present disclosure, in at least some embodiments, includes a distributed multiuser environment whereby users may collaborate and/or iteratively generate and/or apply classification models.

Further still, the present disclosure includes a land classification approach that may include feature extraction from images to generate a feature stack having one or more data layers related to image data that may facilitate improved model generation and pixel classification for the image data. For instance, the present disclosure includes feature generation modules for creation of morphological, textural, and/or spectral feature layers for a given image that may be utilized in model generation and/or pixel classification to provide for improved land use classification.

Additionally, the present disclosure provides metrics for evaluation of land classification. For instance, the present disclosure provides techniques that may be used to judge the ability of different classification models to accurately classify image data into land use classifications. As such, it may be appreciated that for different geographies and/or different time periods, the specific techniques used in classification of image data may not be constant. That is, development of a one-size-fits-all type model is impractical and less accurate than specific models for specific geographies and/or specific time periods that may be generated. As such, determination of evaluation metrics of modules may allow for creation of robust classification modules specifically tailored for an application. In this regard, the distributed, multi-user collaborative environment facilitated by the architecture of land classification systems herein may allow for collaborative development of tailored classification models based on a specific context to be addressed by the model.

A first aspect includes a land classification system operable for analysis of very high resolution (VHR) remotely-sensed multispectral Earth imagery. The system includes an image store containing image data corresponding to VHR remotely-sensed multispectral Earth images. The system also includes at least one feature extraction module in operative communication with the image store. The feature extraction module is operable to produce feature data regarding at least a portion of image data. In turn, the system includes a feature stack that includes the image data and the feature data. The system also includes a client interface operable to receive training data regarding at least one or more pixels of the image data from a user regarding at least one class to which the one or more pixels belong. The system also includes a classification compute module operable to generate a classification model at least in part based on a portion of the feature stack corresponding to the one or more pixels and the training data. The classification model relates to classification of pixels of image data into one or more classes.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in an embodiment the classification compute module may be operable to apply the classification model to the image data to classify pixels of the image data into the one or more classes. Accordingly, the classification compute module may classify pixels of the image data based on an analysis of the feature stack in relation to the classification model.

In an embodiment, the system may include a post classification analysis module that is operable to reclassify at least one pixel of the image data based on at least one post classification rule. For instance, the post classification rule comprises at least one of a minimum mapping unit rule, a surrounded by rule, a topological relation rule, a majority analysis rule, or a smoothing rule.

It may be appreciated that the land classification system may be particularly adept at classification of image data that is remotely-sensed, multispectral Earth image data (e.g., satellite image data). In this regard, the VHR remotely-sensed multispectral Earth image data may include spectral band data corresponding to at least 8 multispectral bands. The multispectral bands may collectively range from at least about 300 nanometers in wavelength to at least about 1100 nanometers in wavelength. In another embodiment, the multispectral bands may collectively range from at least about 300 nanometers in wavelength to at least about 2400 nanometers in wavelength. Furthermore, the multispectral bands may include a plurality of short wave infrared (SWIR) bands. The plurality of SWIR bands range from at least about 1100 nanometers in wavelength to at least about 2400 nanometers in wavelength.

Additionally, the feature stack may include a plurality of data layers, wherein each data layer includes different feature data for each pixel of the image data. The feature stack includes at least one spectral feature layer, at least one morphological feature layer, or at least one textural feature layer. The at least one spectral feature layer may include data values for each pixel of the image data based on spectral band data collected by a remote image acquisition platform. For example, the remote image acquisition platform may include a satellite imaging system. In any regard, at least one spectral feature layer may include a relative measure between at least two spectral band data layers.

Furthermore, the at least one morphological feature layer may include, for each given pixel of the image data, information based on the arrangement of adjacent pixels relative to the given pixel. The textural feature layer may include information for a given pixel based on a spatial distribution of tonal variations within one or more spectral band data layers relative to a given pixel.

In an embodiment, the client interface may include an internet browser-based client operable to provide a user interface for receiving the training data from a user. In this regard, the client interface may include a plurality of distributed client interfaces operable to receive training data from a plurality of users. As such, the classification model is at least partially based on training data received from a plurality of users.

In an embodiment, the system may include a plurality of feature extraction modules each operable to generate a feature data layer of the feature stack. One or more of the feature extraction modules may be selectively applicable to image data by a user to generate feature data layers. For example, a number of feature extraction modules may be, but are not required to be used in the land classification system. These feature extraction modules may include a fractal dimension feature extraction module, a total variational feature extraction module, a rotationally invariant histogram of gradients (HOG) feature extraction module, a Gabor wavelet feature extraction module, a clustering histogram feature extraction module, or any other appropriate feature extraction module.

Accordingly, the fractal dimension feature extraction module may be operative to generate feature data by identifying an image of a predetermined size of pixels, dividing the image into a plurality of abutting square windows having a side dimension less than the predetermined size of the image, and constructing for each plurality of abutting square windows a column having a height as represented in increments of the side dimension of the abutting window. The height of the column may be determined such that the ratio of the predetermined size of the image to the side dimension of the abutting windows equals the ratio of a maximum pixel value for a given multispectral band of the image to the height. The squared side dimension and the height may represent a plurality of boxes whose volume is defined by increments of the side dimension. In this regard, the fractal dimension feature extraction module may determine, for each abutting window a box from the plurality of boxes in which a maximum pixel value and a minimum pixel value occur and may calculate, for each of the plurality of abutting windows, the number of boxes separating the box in which the maximum pixel value is disposed and the box in which the minimum pixel value is disposed. The module may also sum the number of boxes separating maximum and minimum pixel levels over all of the plurality of abutting windows to generate a summed value. In turn, the module may repeat each of the constructing, determining, calculating, and summing operations for all possible values of the side dimension of the plurality of abutting windows such that each side dimension is less than or equal to half of the predetermined size of the image and at least greater than three pixels in length. Additionally, the module may plot each summed value generated in the repeating step to determine a slope of the summed values, wherein the slope comprises the fractal dimension of the image.

In an embodiment, the image of the predetermined size is a subset portion of a larger image. In turn, the fractal dimension may be calculated for each subset portion of the larger image is used to generate a fractal map comprising an aggregated mapping of the fractal values of each subset portion over the larger image. As such, a fractal map may be generated for each spectral band of a multispectral image. The fractal dimension may be at least partially dependent upon the spectral band, wherein each fractal map is independently generated of other fractal maps of the other spectral bands of the plurality of spectral bands.

In another embodiment, at least one of the feature extraction modules may include a total variational (TV) feature extraction module. The TV feature extraction module may include a multispectral filtering module using a plurality of spectral bands of an image to generate a filtered image corresponding to the image. The number of spectral bands used in the filtering operation may be at least 8 multispectral bands.

The filtering operation may include minimizing a function including at least a first term representing the difference between the original image and the filtered image and at least a second term representing the spatial homogeneity of the filtered image. In this regard, the first term and the second term may include a multivalued vector for each pixel representative of the image or filtered image, respectively, wherein the multivalued vector values include a component for each row, column, and multispectral band in the image. At least one of the first term or the second term include an L1 norm. Additionally, the second term is weighted by a smoothing factor. The minimization of the function may be solved using a Split Bregman technique. The Split Bregman technique may include Gauss-Seidel updates. In this regard, the minimization is solved by execution on a graphics processing unit (GPU).

In an embodiment, at least one of the feature extraction modules may include a rotational invariant histogram of gradients (HOG) feature extraction module. The rotational invariant HOG feature extraction module may be operative to generate feature data by establishing a plurality of angular bins for an image in a gradient domain, histogramming gradients from the image with respect to the plurality of angular bins, and selecting based on the histogramming the angular bin with the largest histogram value to define a primary direction. Additionally, the module may set a plurality of pooling windows with relative offsets from a pixel of interest and define a gradient orientation window encompassing the plurality of pooling windows. The module may configure the gradient orientation window to align the configuration of the gradient orientation window relative to the primary direction. Also, the module may shift the positions of the pooling windows relative to the gradient orientation window based on the configuring. The module may also rotate the internal orientation of the pooling windows based on the configuring.

In an embodiment, the shifting may include shifting the pooling windows relative to the gradient orientation window by a number of bins determined in the selecting step. The rotating may also include shifting the internal orientation of the pooling windows by a number of bins determined by the rotating step. Accordingly, a HOG is calculated relative to each of the shifted and rotated pooling windows. The calculating may include using an integral image to calculate the HOG feature for each pooling window.

In an embodiment, at least one of the feature extraction modules may include a Gabor wavelet feature extraction module. The Gabor wavelet feature extraction modules may be operative to generate feature data by applying a plurality of Gabor wavelet functions to an image, wherein each of the plurality of Gabor wavelet function includes a different orientation and computing at least one feature based on at least two of the plurality of Gabor wavelet functions. For example, the at least one feature may include at least one of a sum of the absolute values of a first Gabor wavelet function of the plurality of Gabor wavelet functions and a second Gabor wavelet function of the plurality of Gabor wavelet functions, a sum of the magnitude of values of the product of each perpendicularly oriented Gabor wavelet function of the plurality of Gabor wavelet functions, or the difference of the maximum and minimum values of magnitude of all of the plurality of Gabor wavelet functions for all image data. As such, for each orientation of the plurality of Gabor wavelet functions, a plurality of different Gabor wavelet functions with a different scale are calculated. The different scales may include varied values for at least one of a wavelength of the Gabor wavelet function or an envelope of the Gabor wavelet function. Each of the plurality of Gabor wavelet functions may be applied to each pixel of each multispectral band of an image comprising a plurality of multispectral bands. At least one feature may be determined independently for each of the plurality of bands. Additionally or alternatively, the at least one feature may be determined with respect to all of the plurality of bands.

In an embodiment, at least one of the feature extraction modules may include a clustering histogram feature extraction module for extraction of features based on clustered and classified spectra values. The clustering histogram feature extraction module may be operative to generate feature data by assigning each pixel of an image into one of a plurality of a predefined classes and identifying a kernel surrounding each pixel containing a plurality of others pixels from the image, wherein each of the plurality of other pixels have been assigned into one of the plurality of predefined classes. Furthermore, the module may build a histogram for each pixel based on the number of other pixels in each of the plurality of predefined classes relative to the pixel for which the histogram is built. The plurality of predefined classes may correspond to identified land classifications based on at least one of land use or land class. The pixels may be assigned into a predefined class based on the radiometric properties of a pixel used in a clustering technique. The clustering technique may include at least one of k-means clustering, a Euclidean distance approach, or a Mahalanobis distance approach.

In an embodiment, the classification compute module may be operable to utilize at least one machine learning algorithm to generate the classification model. The classification compute module may also be operable to utilize a plurality of machine learning algorithms to generate the classification model. For instance, a user may be operable to specify at least one of a plurality of machine learning algorithms for use in generation of the classification model.

Also, in an embodiment, the classification model may include at least one model parameter corresponding to at least one of a geographic region or a temporal period. The classification computation module model may be operable to determine the classification model for classification of image data based on the at least one model parameter and image data metadata. In an embodiment, the one or more classes correspond to at least one of a land cover, a land use, or temperature.

The system may also include a model evaluation module operable to provide quantifiable evaluation data regarding the classification module based on performance of the classification module with respect to a portion of training data received by a user. The model evaluation module may be operable to generate a classifier accuracy value for the classification module. For instance, the model evaluation module may be operable to generate at least one precision measurement for the classification module. The model evaluation module may also be operable to compare a first model to a second model to determine if the performance of the first model is statistically significant over the performance of the second model.

In an embodiment, the feature extraction module may be operable to first produce feature information for pixels belonging to the training data prior to generation of the classification model by the classification compute model. The module may further be operable to second produce feature information for pixels other than the training data prior to application of the classification model to classify pixels other than the training data.

A second aspect includes a method for land classification based on analysis of very high resolution (VHR) remotely-sensed multispectral Earth imagery. The method includes storing VHR remotely-sensed multispectral Earth image data in an image store, generating feature data based on the image data using at least one feature extraction module, and compiling a feature stack comprising the image data and corresponding feature data. The method further includes receiving training data regarding at least one or more pixels of the image data from a user regarding at least one class to which the one or more pixels belong and generating a classification model at least in part based on a portion of the feature stack corresponding to the one or more pixels and the training data, wherein the classification model related to classification of pixels of image data into one or more classes.

A number of feature refinements and additional features are applicable to the second aspect. These feature refinements and additional features may be used individually or in any combination. As such, each of the following features that were discussed above in relation to the first aspect may be, but are not required to be, used with any other feature or combination of features of the second aspect.

BRIEF DESCRIPTION OF THE FIGURES

The accompanying drawings illustrate several embodiments of the present disclosure and, together with the description, serve to explain the principles according to the embodiments. One skilled in the art will recognize that the particular embodiments illustrated in the drawings are merely exemplary, and are not intended to limit the scope of the present disclosure.

FIGS. 7-10B depict embodiments of screen shots of a user interface for receipt of training data from a user and presentation of land classification results to a user.

DETAILED DESCRIPTION

Figure 1:
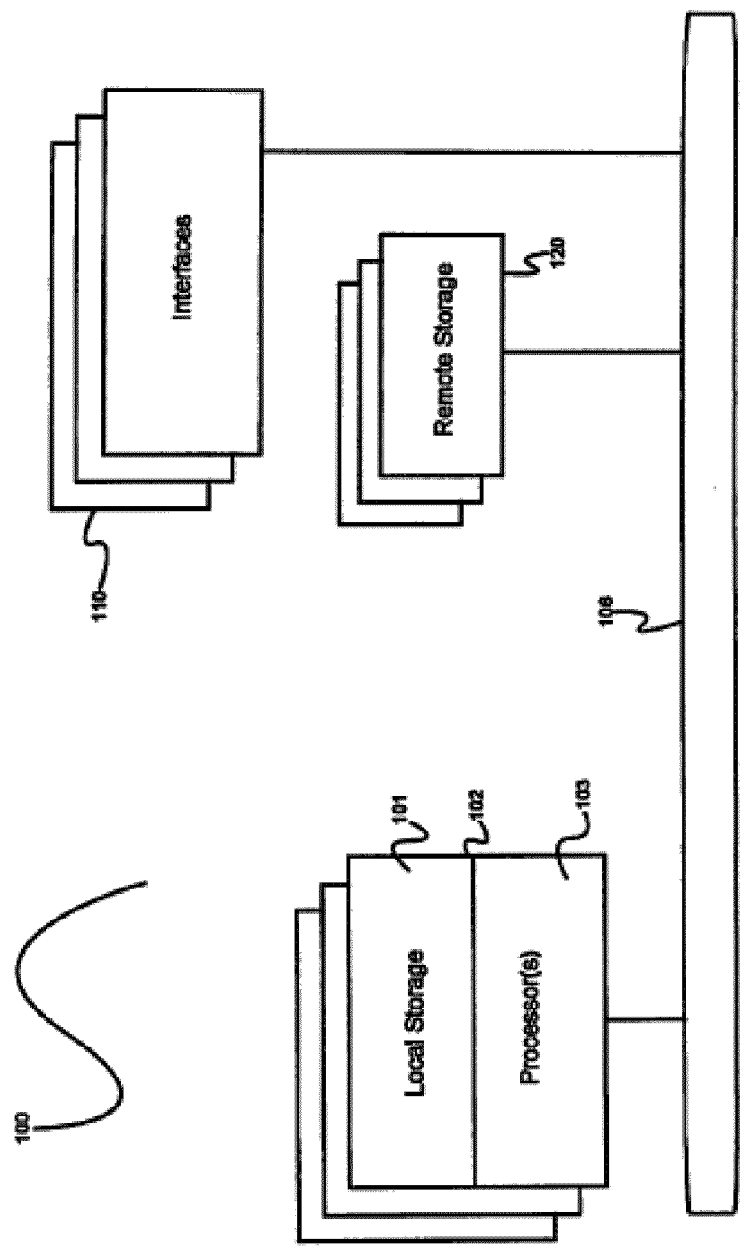
FIG. 1 is a block diagram illustrating an exemplary hardware architecture of a computing device used in an embodiment.

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Devices that are described as being in communication with each other need not be in continuous communication with each other, unless expressly specified otherwise. In addition, devices that are described as being in communication with each other may communicate directly or indirectly through one or more intermediaries, logical or physical. A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions.

Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

As used herein, a "feature" may correspond to an individual measurable heuristic property of a phenomenon being observed (e.g., a value related to image data). In this regard, features or feature data may be extracted from image data (e.g., by performing calculations and/or transformations of image data). As used herein, a "pixel-level feature" is a feature at a base level of classification. For example, pixel-level features may include textural properties, mathematical transforms applied to pixel data, a land-cover classification, or some other appropriate property description specific to individual pixels. As used herein, a "region-level feature" is a feature at a higher level of classification. For example, region-level feature observations may be related to morphology, i.e., may have shape properties (such as, area, perimeter, compactness, elongation, eccentricity, etc.), spatial relationships (such as, arrangement, distance, etc.), object classifications (for example, a school, paring lot, swimming pool, plane, shopping mall, etc.), and the like. As used herein, a "scene-level feature" is a feature that may aggregate statistics on lower level features (e.g., region-level features or pixel-level features), such as, percentage land cover (for example, 25% deciduous forest, 10% water, etc.), aggregate object counts (for example, 10 schools, 35 parking lots, etc.), other descriptive classifications (for example, desert, city, rainforest, etc.)

As used herein, a "graphics processing unit (GPU)" is a specialized electronic circuit known in the art that is designed to rapidly manipulate and alter memory to accelerate the creation of images in a frame buffer intended for output to a display or for other computational purposes. As used herein, a "Compute Unified Device Architecture (CUDA)" is a parallel computing platform and programming model known in the art created by NVIDIA™ and implemented by the graphics processing units (GPUs) that they produce that gives developers access to a virtual instruction set and memory of the parallel computational elements in CUDA GPUs.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine (JVM) or equivalent, or files containing higher level code that may be executed by the computer using an interpreter (for example, scripts written in Python, Perl, Ruby, Groovy, or any other scripting language).

Figure 2:
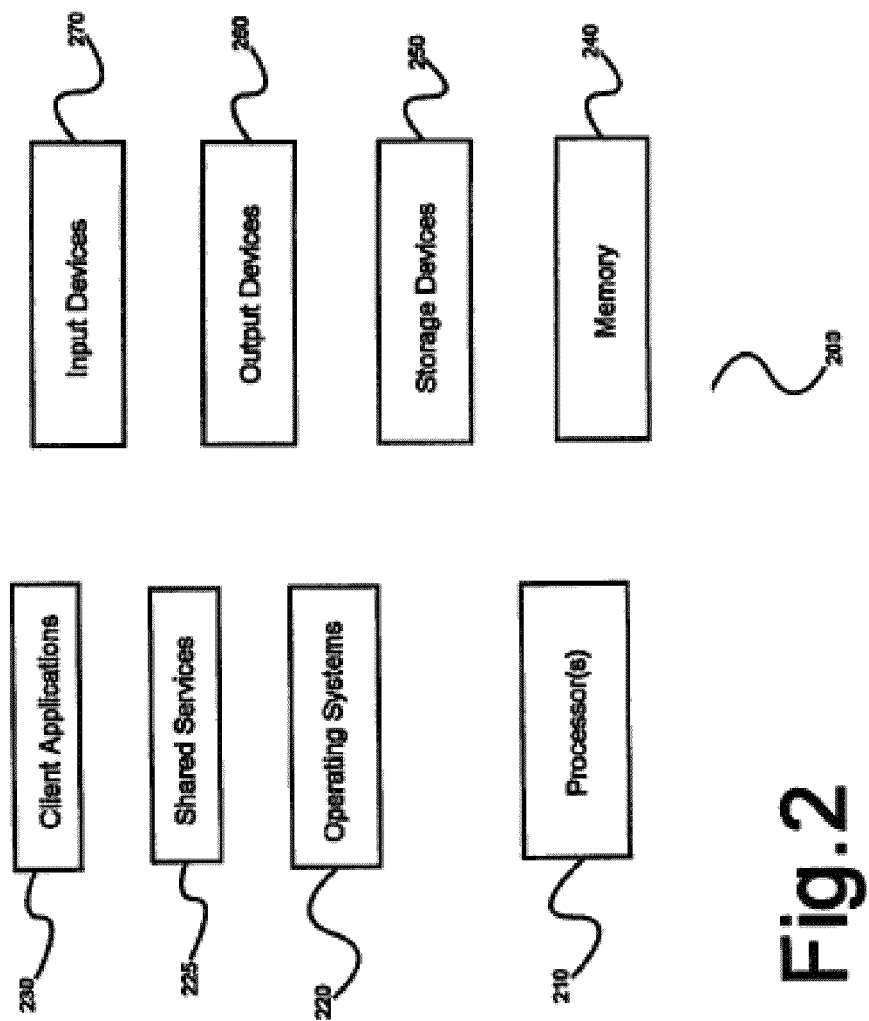
FIG. 2 is a block diagram illustrating an exemplary logical architecture for a client device, according to an embodiment.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
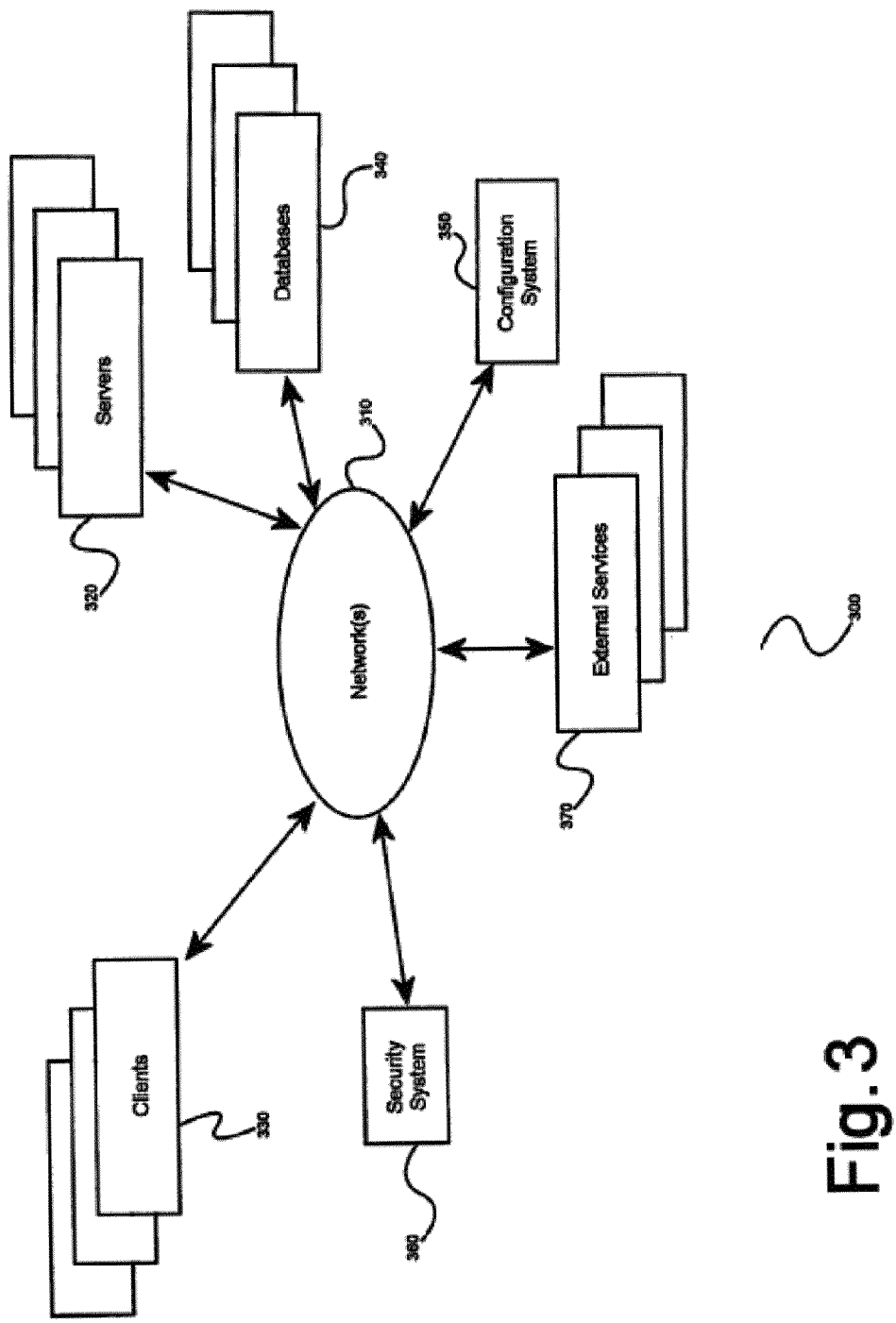
FIG. 3 is a block diagram showing an exemplary architectural arrangement of clients, servers, and external services, according to an embodiment.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided.

Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Figure 4:
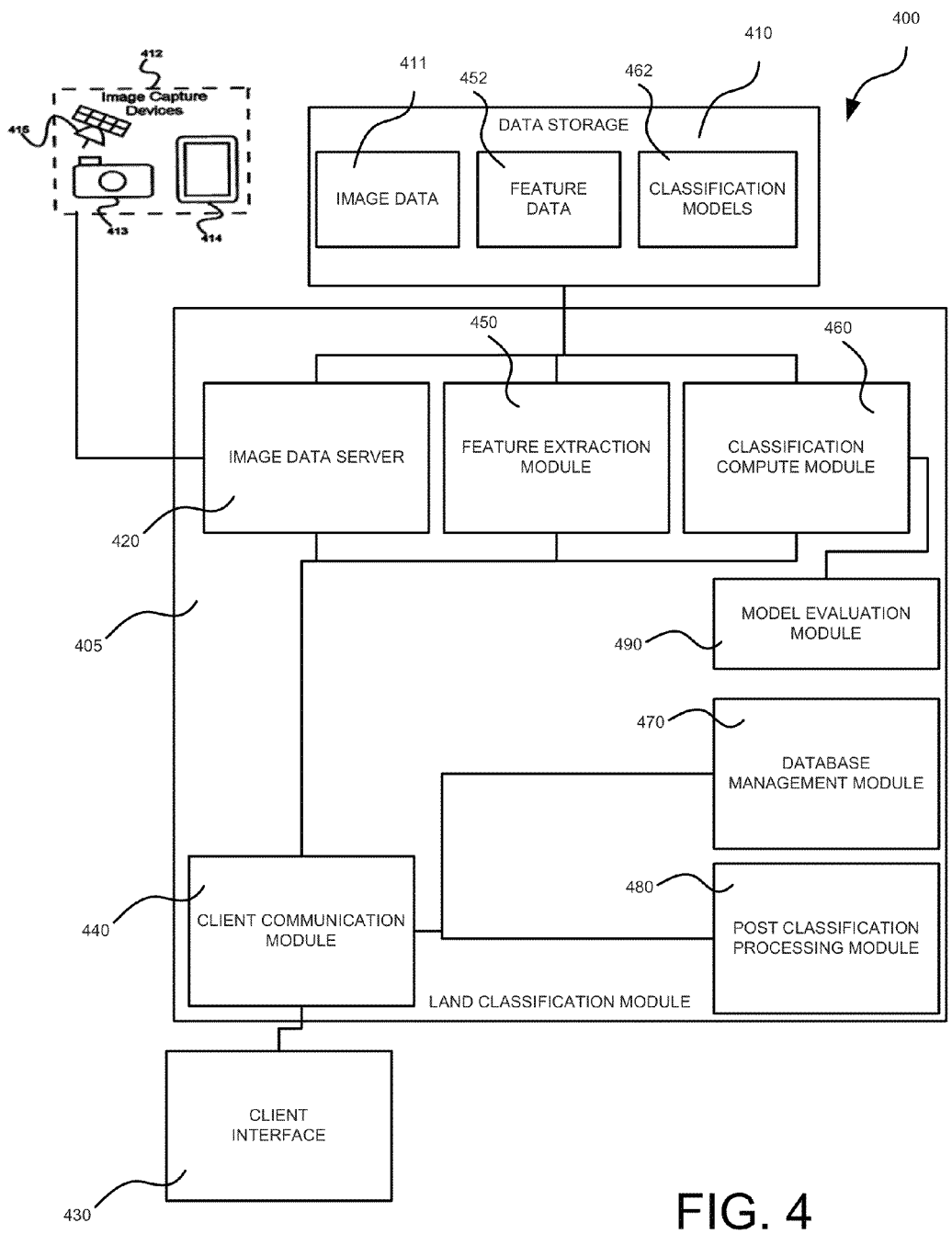
FIG. 4 is a block diagram illustrating an exemplary system for generation and application of classification models for land classification.

FIG. 4 is a block diagram illustrating an exemplary system 400 that may be used for land classification. As illustrated, system 400 may comprise a plurality of software or hardware elements that may be variably interconnected, and it should be appreciated that such components may be variable in implementation; that is, components may be software-based and stored and operating on separate or joined hardware systems interchangeably (for example by running multiple software systems on a single computer server), or may be physically-distinct hardware such as dedicated computing hardware for specific elements as illustrated. It should be further appreciated that connections between components as illustrated may be direct physical connections (such as via cables or internal software connectivity within a hardware system operating multiple components as described above) or they may be remote data connections such as communication over the Internet or another communications network. In this manner, it should be appreciated that the constructions and arrangement illustrated is exemplary, and a variety of arrangements may be possible, and it should be further appreciated that the quantity and arrangement of components is exemplary and alternate or additional components may be utilized. In this manner it can be appreciated that the nature of the system 400 is flexible and scalable, i.e. it may be arranged as suitable for varying particular implementations as may be appropriate (such as a small-scale implementation utilizing software elements operating within a personal computer for individual use, or a large-scale implementation utilizing separate computer servers for operation utilizing greater computing power or storage space, as may be desirable for an enterprise or cloud-based service).

As illustrated, image data 411 may be made available to an image data server 420, and may be stored in a data store 410 or similar data storage. Image data 411 may be of variable nature such as simple stored images or more detailed information or "metadata" stored along with images such as image tags or other identifying data (such as, as is common in the art, data pertaining to when, where, or how an image was captured, such as might be recorded by an image capture device 412 when taking a snapshot). Furthermore, image data 411 need not be an existing cache of stored data, and could be a quantity of "live" data being accessed by system 400 for operation such as capturing images via any appropriate image-capture devices 412 connected to system 400 such as cameras 413, image capture-capable electronic devices such as tablet computing devices or smartphones 414, or aerial or satellite imaging systems 415.

It should be appreciated that the data store 410 may be accomplished via a variety of means common in the art, such as a single physical storage medium (such as magnetic, optical, solid-state, or other storage devices common in the art), or a distributed storage system (such as a distributed file storage system as may be utilized in computing clusters), and further that such storage may be local (i.e., stored and operating alongside other components of system 400 such as a server's hard disk drive or a connected storage system) or remote (such as a remotely-connected and accessible storage device or a cloud-based storage service), and that connection may be accomplished via either physical or remote means, as described previously. In this manner it should be appreciated that image storage is highly variable, further enabling a flexible and scalable design that may be readily adapted to a variety of storage means as may be appropriate, without necessitating the manipulation of existing data.

The system 400 may include a land classification module 405 that includes the image data server 420. As such, image data 411 may be received at the land classification module 405 and in turn stored in the data store 410. As described above, the image data 411 may include raw image data received from an image capture device 412 or the image data 411 may include image data 411 that has been preprocessed. For instance, in the case of VHR remotely-sensed multispectral Earth imagery, the image data 411 received at the land classification module 405 may be orthorectified and/or atmospherically compensated satellite imagery. Other image processing common to remotely-sensed imagery may also be provided without limitation.

In this regard, the image data 411 may include a digital number representing a gray level value for each pixel of an image in at least one spectral band. The gray level value may be representative of a surface reflectance of the Earth for a given pixel in a given spectral band and/or may include an atmospherically compensated value. In one exemplary application, the image data 411 received at the land classification module 405 may be multispectral satellite imagery including a plurality of bands, a panchromatic band, or a combination thereof. For instance, in VHR remotely-sensed multispectral Earth imagery, a plurality of spectral bands may be collected. That is, the image sensor (e.g., provided on a satellite imaging system 415) used to collect the image data 411 may have a plurality of specifically designed sensor portions capable of detected light at a predetermined wavelength. For instance, WorldView 2 operated by DigitalGlobe, Inc. of Longmont, Colo. collects data in 8 spectral bands including, for example, a coastal band (400-450 nm), a blue band (450-510 nm), a green band (510-580 nm), a yellow band (585-625 nm), a red band (630-690 nm), a red edge band (705-745 nm), a near-infrared 1 band (770-895 nm), and a near-infrared 2 band (860-1040 nm). There may also be a panchromatic sensor capable of detecting black and white imagery (also referred to as a panchromatic band) in the wavelength band of 450-800 nm. Further still, in at least some embodiments, one or more bands in the short-wavelength infrared range (SWIR) may be provided. For example, one or more SWIR bands may be provided including, for example, SWIR 1 (1195-1225 nm), SWIR 2 (1550-1590 nm), SWIR 3 (1640-1680 nm), SWIR 4 (1710-1750 nm), SWIR 5 (2145-2185 nm), SWIR 6 (2185-2225 nm), SWIR 7 (2235-2285 nm), and/or SWIR 8 (2295-2365 nm). Other combinations and/or ranges of SWIR bands generally from about 1195 nm to about 2400 nm may be provided in any combination. For example, in some embodiments, band definitions broader and/or narrower than those described above may be provided without limitation. In any regard, there may be a plurality of band values corresponding to gray level values for each band for each given pixel in a portion of multispectral image data.

Additionally, the image data 411 may include metadata that may include supplementary data regarding the acquisition of the image. For instance, image metadata that may accompany and/or form a portion of the image data 411 may include satellite parameters (e.g., off nadir satellite angles, satellite attitudes, solar elevation angles, etc.), time/date of acquisition, and/or other appropriate parameters may be attributed to the metadata of an image 411.

The land classification module 405 may also include a client communication module 440 that is operable to communicate with a client interface 430. In view of the description above, it may be appreciated that the land classification module 405 may be executed with respect to a distributed system. In this regard, the client interface 430 may include a user interface that is presented to a remote user such that the client interface 430 may communicate with the land classification module 405 over an appropriate network. As such, it may be appreciated that there may be provided a plurality of client interfaces 430 to facilitate multiple users accessing the land classification module 405. Accordingly, the client communication module 440 may be operable to communicate (e.g., receipt and/or transmission of data) to and/or from the plurality of client interfaces 430.

In an embodiment, the client interface 430 may be provided as a web browser based interface that may communicate with an application programming interface at the client communication module 440 to facilitate communication between the land classification system 405 and the client interface 430. In this regard, the communication between the client interface 430 and the client communication module 440 may be provided in an appropriate protocol associated with internet communication such as, for example, hypertext transfer protocol (http), although other protocols may be used. Accordingly, the client interface 430 may be provided as a web based interface that facilitates user interaction with the land classification system 405 as will be described in greater detail below.

In another embodiment, the land classification system 405 and client interface 430 may be provided locally at a single computing device for execution. As such, the client interface 430 may comprise one or more user interface devices of a workstation that may also execute the land classification module 405 locally.

The land classification system 405 may also include one or more feature extraction modules 450. The feature extraction module(s) 450 may be operable to access the data store 410 and image data 411. Each feature extraction module 450 may be operable to generate feature data 452 regarding one or more predetermined features. The feature data 452 may be generated based on the image data 411. In turn, the feature data 452 may be stored in the data store 410. For instance, the feature data 452 may be stored in corresponding relation to the image data 411 such that for a given pixel, a plurality of feature layers of data may be provided that is stored in correspondence with the image.

Figure 6:
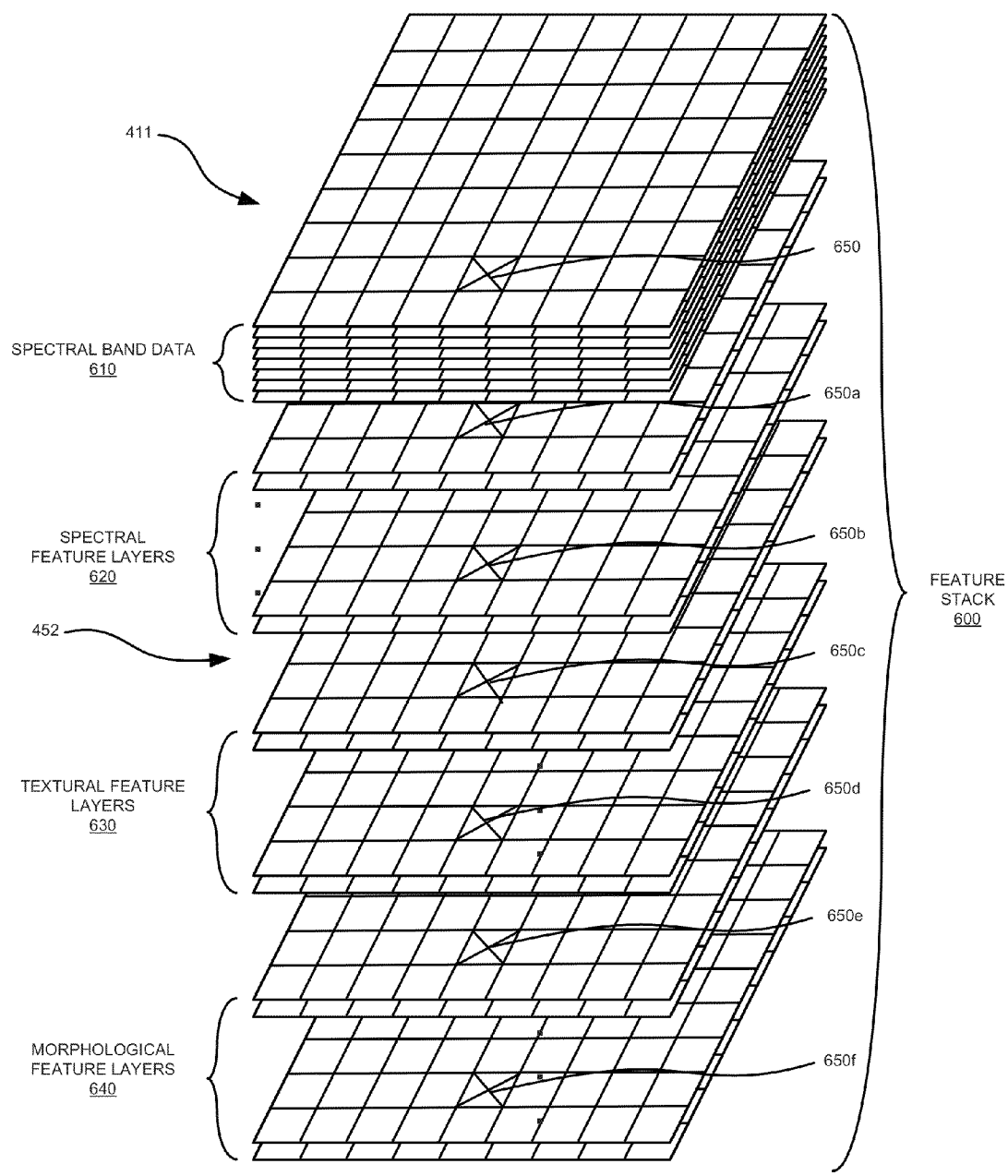
FIG. 6 depicts an embodiment of a feature stack of feature data including a plurality of data layers that may be used in land classification.

With further reference to FIG. 6, it may be appreciated that for each portion of image data 411, a plurality of layers of information or data related to or comprising subcomponents of the image data 411 may be provided in the form of a feature stack 600. In this regard, the feature stack 600 may include image data 411 (e.g., spectral band data 610 for each pixel) and one or more layers generated by way of a feature extraction module 450. For instance, the spectral band data 610 may include a gray value for each pixel for each spectral band provided. In this regard, as shown in FIG. 6, eight spectral bands are provided corresponding to, for example, spectral data collected from the eight spectral detectors of the WorldView 2 satellite imaging system 415 operated by DigitalGlobe, Inc. However, additional or fewer numbers of spectral bands may be provided in the spectral band data 610.

In any regard, a visible image may be generated that may include components from one or more of the layers of the feature stack 600. For instance, in one embodiment, data from the spectral band data 610 corresponding to wavelengths visible to the human eye, such as for example, the red, green, and blue bands may be combined to produce a natural color image representative of the image as visible to the human eye. This layer may be stored as a spectral feature layer 620 as it may comprise a function (i.e., an extracted feature) based on one or more of the spectral band data 610. Furthermore, visible images may be generated based on gray level values from spectral band data 610 not visible to the human eye to generate visible representations of such bands (e.g., alone or in combination with other human visible and/or nonhuman visible bands to generate false color images). In this regard, the spectral feature layers 620 of the feature stack 600 may include, for example, layers that include spectral band data 610 of the image data 411 and/or combinations thereof.

Accordingly, the extraction of a limited number of bands (e.g., the red, green and blue bands or "RGB" bands to construct an RGB natural color image) may allow for reduced computational overhead when presenting the image data to the user. That is, rather than loading and/or attempting to display all values of all bands available for an image, the RGB bands may be used to present an image that represents the human-visible portion of the spectrum. Accordingly, where the user views or manipulates the image (e.g., for purposes of providing training data or the like), the use of the RGB image may be more efficiently loaded and/or manipulated with less computational overhead.

The spectral feature layers 620 may also include ratios of gray values for one or more bands for each pixel based on the spectral band data 610. For example, in one ratio of spectral bands that may be generated as a layer includes:

$$\frac{(\text{Band } A_i - \text{Band } B_i)}{(\text{Band } A_i + \text{Band } B_i)} \qquad \text{Equation 1}$$

where Band $A_i$ represents a pixel value from a first spectral band in the spectral band data 610 for a given pixel i, and Band $B_i$ represents a pixel value from a second spectral band in the spectral band data 610 for the given pixel i.

The feature extraction modules 450 may also be operable to generate data layers that include feature values for a given portion of image data 411. For example, textural feature layers 630 and/or morphological feature layers 640 may also be generated for a portion of image data 411 that form a portion of the feature stack 600.

In any regard, it may be appreciated that the layers in the feature stack 600 may each include corresponding pixel feature data for a pixel from the image data 411. For example, in FIG. 6, the image data 411 may include a nine pixel by nine pixel portion of image data 411. A highlighted pixel 650 has been denoted with an "x." Values for pixels 650a-650f are also provided in various feature data layers that correspond to pixel 650 and also denoted in the feature data layers of the feature stack 600. These additional corresponding pixels 650a-650f are each provided in a corresponding position in a respective feature data layer to pixel 650. That is, for each feature data layer, a corresponding nine by nine pixel map may be provided with values corresponding to the feature data for each one of the pixels of the image data 411. It may be appreciated that the resulting feature data layer generated by a feature extraction module 450 may, but need not, correspond to the size of the portion of image data 411 used to generate the layer. That is, the resulting data layer may be a larger or smaller array than the image data 411. Furthermore, each pixel in the feature data layer may be a vector value or other type of output corresponding to a portion of the image data 411. However, in the example depicted in FIG. 6, for example, pixels 650a and 650b may include values corresponding to spectral features extracted from pixel 650 (e.g., from one or more of the spectral band data 610 corresponding to pixel value 650). Pixels 650c and 650d may include values corresponding to textural features extracted based on a feature extraction operation carried out relative to pixel 650. Pixels 650e and 650f may include values corresponding to morphological features extracted based on a feature extraction operation carried out relative to pixel 650. In any regard, it may be appreciated that for a given pixel 650, corresponding feature values (i.e., pixels 650a-650f) may be provided that correspond to the pixel 650. As such, the values for pixels 650a-650f may be associated with pixel 650 such that the values for each of the pixels may be associated. This may be particularly valuable in a supervised machine learning process as will be appreciated in greater detail below.

It may further be appreciated that in the case of VHR remotely-sensed multispectral Earth imagery, each pixel 650 may be correlated to a corresponding geographic position. As such, for each pixel 650, a geographic identifier may be provided that is indicative of the geographic location corresponding to a given pixel 650.

Textural feature layers 630 may be generated using feature extraction modules 450 including, for example, Gabor filter feature data, histogram of oriented gradients (HOG) features, or any appropriate other textural features. Morphological feature layers 640 may be generated using feature extraction modules 450 including, for example, identification of human buildup or the like (e.g., as discussed in U.S. patent application Ser. No. 14/013,904 entitled AUTOMATIC EXTRACTION OF BUILT-UP FOOTPRINTS FROM HIGH RESOLUTION OVERHEAD IMAGERY THROUGH MANIPULATION OF ALPHATREE DATA STRUCTURES filed on Aug. 29, 2013, the entirety of which is incorporated by reference). As may be appreciated from FIG. 6, there may be any number of spectral feature layers 620, textural feature layers 630, and/or morphological feature layers 640 provided in the feature stack 600. In this regard, it may be appreciated that certain feature modules 450 capable of generating feature layers may provide particularly relevant features for use in land use classification.

For example, specific examples of feature extraction modules 450 that may be utilized in the land classification system 405 are discussed below. However, it may further be appreciated that any other feature extraction module 450 may be utilized that may generate feature data 452 to generate a data layer that may be useful in land classification.

One example of a feature extraction module 450 that may execute in the feature extraction system 400 described above is a fractal dimension feature extraction module. The term "fractal dimension" effectively defines the extent to which a lower dimensional function (e.g., a one dimensional line, two dimensional plane, etc.) effectively occupies a space of a higher dimension (e.g., two dimensional space in the case of the one dimension line or three dimensional space in the case of the two dimensional plane). That is, the fractal dimension may provide a measure of the complexity of a function of a given dimension. As an example, two one dimensional lines defined as $$y = \sin\left(\frac{10}{x}\right)$$

and $$y = x,$$

respectively, may have differing fractal dimensions for an interval of −0.2≤x≤0.2. That is, the function $$y = \sin\left(\frac{10}{x}\right)$$

may have a higher fractal dimension over the interval than the function y=x as the sine function may occupy much more of the space in the interval although both functions have a topological dimension of one.

Accordingly, for an image, the gray level values for a given spectral band may be considered as describing a convoluted, two-dimensional surface, the fractal dimension of which may provide information about the "roughness" of the two-dimensional surface defined by the gray level values. That is, the image may be conceptualized as a three dimensional surface whose height from the normal at each pixel is represented by a gray value of the pixel. In this regard, the fractal dimension feature extraction module may be operable to extract feature information in relation to the fractal dimension of one or more portions of an image that may provide useful information regarding the nature of the image. The fractal dimension for a given portion of an image may be determined using any appropriate method for calculation of a fractal dimension.

Figure 12:
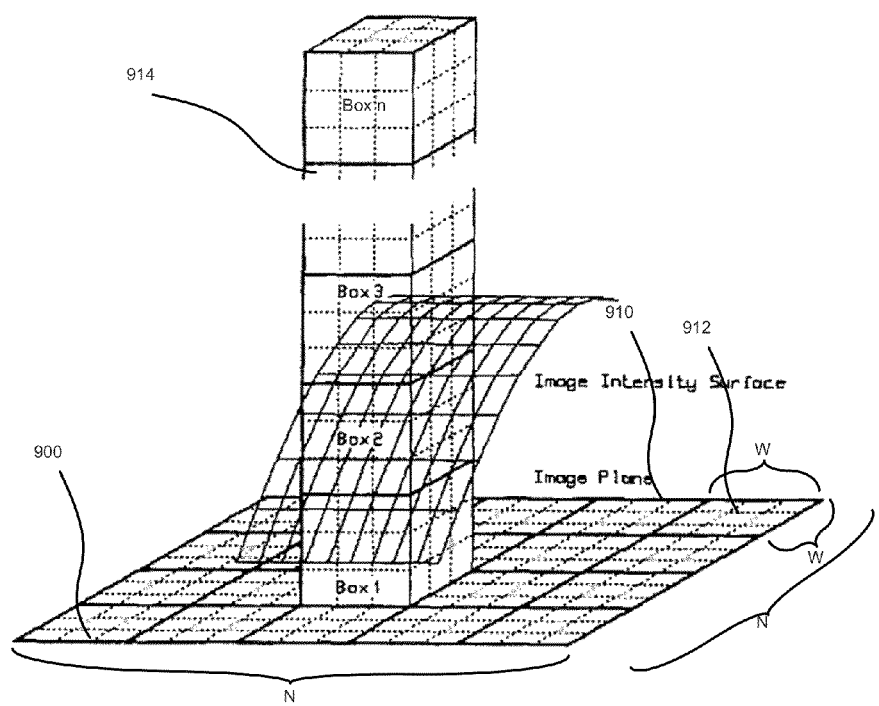
FIG. 12 depicts an embodiment of a graphical representation of a method for determining a fractal dimension of an image.

In one particular embodiment of a fractal dimension feature extraction module conceptually illustrated in FIG. 12, an image 900 may be divided into a plurality of subdivisions 910 of a predetermined size of pixels. This predetermined size of the subdivision 910 of the image 900 may be defined as N×N pixels. As may be appreciated, the subdivision of the image may be provided in accordance with a tiling scheme applied to geospatial images such as tiling schemes commonly used in mapping applications such as, for example, the Google Maps Tiling Scheme, described in the Google Maps API document available from Google, Inc., Mountain View, Calif., the Bing Maps Tiling Scheme, described in the Bing Maps Tile System available from Microsoft Corporation, Redmond, Wash., or a custom tiling scheme that may, for example, be a geographic based projection. For each predetermined image of size N×N, the image may be divided into a plurality of abutting windows 912 within the N×N image of size W×W pixels, where W is an integer that complies with the inequalities $$W \leq \frac{N}{2}$$

and $$W \geq 3$$

and represents a side dimension of the abutting window 612.

As such, for each window 912 of size W×W, a column of boxes 914 having a volume of W×W×W' may be constructed. In this regard, W' may be considered the height of the column 914. The height may be represented in increments of the side dimension of the abutting window (W). In this regard, the height may be determined such that the ratio of the predetermined size of the image (N) to the side dimension of the abutting windows (W) equals the ratio of the maximum pixel gray value for a given multispectral band of the image to the height of the column 614. That is, where D is the gray level range for the image, the height of the column 914 may be determined with the equation $$\frac{N}{W} = \frac{D}{W'}.$$

As such, a column or W×W×W' is created for each abutting window in the image.

In this regard, for each abutting window 912 of size W×W, the minimum and maximum gray value for each pixel is located within a specific one of the boxes defined in the W×W×W' sized column 914. The boxes of size W×W×W' may be numbered with successive integers in ascending order extending away from the base of the column (e.g., as shown in FIG. 12 as Box 1, Box 2, Box 3 ... Box n). Once the minimum and maximum gray value has been located, the distance separating the minimum and maximum values may be computed as n=h−l+1 where h and l are the numbers of boxes with the highest and lowest values, respectively, over the W×W×W' sized box. This process is repeated for each abutting window 912 of size W×W to determine a column height W' and a n value for each. The total number of boxes to cover the whole image subdivision 910 of size N×N may be calculated as:

$$N_W = \Sigma_{i,j} n \qquad \text{Equation 2}$$

This process is further repeated for all values of W that satisfy the above noted inequalities related to the size of W. In turn, a log-log plot of values of $N_W$ versus W may be generated and the negative slope of the least squares line of the plot may define the fractal dimension. In turn, each subdivision 910 of the image 900 may undergo this process to determine the fractal dimension of each subdivision 910. In turn, a fractal map may be generated that is an aggregation of information from each unique N×N subdivision 910 of the original image 900. Such information may be suited for application to decision tree techniques for classification as the textural information per pixel may be relatively dense.

Another feature extraction module 450 that may be provided may include a total variational feature extraction module. In VHR multispectral remotely-sensed Earth imagery, a plurality of spectral bands may be collected. That is, the image sensor used to collect image data may have a plurality of specifically designed sensor portions capable of detecting light at a predetermined wavelength. For instance, World-View 2 operated by DigitalGlobe, Inc. collects data in 8 spectral bands as described above. There may also be a panchromatic sensor capable of detecting black and white imagery in a broad wavelength band (e.g., the wavelength band of 450-800 nm). In any regard, there may be a plurality of band values (e.g., spectral band data 610 shown in FIG. 6) corresponding to gray level values for each band for each given pixel in the multispectral image data 411. Traditionally, feature sets have utilized combinations of gray level values for each spectral band and/or normalized difference ratios as a feature set for analysis, such as the approach described above relating to spectral band ratios. However, it may be appreciated that these values may be corrupted by, for example, sensor noise or local texture on a given surface type. Accordingly, prior approaches have been proposed that filter gray level values over a small spatial window by, for example, taking the mean or median gray level value for a group of pixels in the spatial window. However, while this type of filtering may reduce noise, the filtering may blur information across discontinuities, which, for example, may obscure edge detection or other techniques to be applied to the image. Furthermore, nonlinear median and morphological filters typically operate on a per band basis, where the filter is independently applied to each of the plurality of spectral bands of an image. This becomes less effective for images having a plurality of bands.

In turn, the total variational feature extraction module may operate on a plurality of spectral bands of an image (e.g., all 8 spectral bands of 8 band image data 411) simultaneously to perform a variational simplification across the multiple bands of the image. Accordingly, the output of the total variational feature extraction module is a data layer comprising a filtered set of image bands (i.e., a filtered image) that may be utilized in further image processing (e.g., utilizing the filtered gray level values or normalized ratios therefrom).

The total variational feature extraction module may be a global optimization that all image pixels from a plurality of spectral bands are optimized jointly using the formula:

$$f(u)=\Sigma_i|u_i-x_i|+\lambda|\text{grad}(u_i)| \qquad \text{Equation 3}$$

where i represents a multivalued vector at a pixel, u is the filtered image stack (row, column, band), and x is the input image. The L1 vector norm of a given function g(x) is represented by the value |g(x)| in the above equation, where the L1 vector norm is defined by the equation:

$$|g(x)| = \sqrt{\sum_{i=1}^{n} x_i^2} \qquad \text{Equation 4}$$

The function grad( ) represents a vector-valued spatial gradient defined as:

$$|\text{grad}(u_i)|=\sqrt{|\text{grad}x(u_i)|^2+|\text{grad}y(u_i)|^2} \qquad \text{Equation 5}$$

where gradx( ) and grady( ) represent the spatial gradient in the image x and y directions, respectively. In this regard, Equation 3 may be optimized to determine a global minimum for the image over a plurality of bands. As such, the best filtered image u is found when Equation 3 is globally minimized over the entire image including all spectral bands. In this regard, it may be appreciated that the first term of Equation 3 may penalize the filtered image as the filtered image differs from the original image. The second term of Equation 3 attempts to regularize the filtered image u such that the resulting image values of u are spatially homogenous. To this end, it may be appreciated that as the L1 norm is utilized (e.g., in contrast to the L2 norm), in the first term, an occasional large discrepancy or outlier may be tolerated in the minimization. Similarly, the use of the L1 norm in the second term allows for abrupt edge discontinuities in the second term. Additionally, in the second term $\lambda$ represents a smoothing factor that allows for tuning of the desired smoothness in the resulting filtered image u.

In this regard, Equation 3 may be optimized to determine the resulting global minimum for the function f(u). The solution may be obtained using any optimization approach, however, it has been found that in a preferred embodiment, a Split Bregman technique may be employed. Additionally, Gauss-Seidel updates may be performed. A discussion of the Split Bregman technique is disclosed in Goldstein, Tom and Osher, Stanley, *The Split Bregman Method for L1 Regularized Problems*, available at ftp://ftp.math.ucla.edu/pub/camreport/cam08-29.pdf, the entirety of which is incorporated by reference herein. It has been found that this approach to the optimization is quite fast and maps well to execution on a GPU (e.g., a CUPA process) due to the highly parallel nature of the algorithm.

Another feature extraction module 450 that may be provided is a rotational invariant histogram of gradients module. In this regard, one skilled in the art will recognize that histograms of oriented gradients (HOGs) is an established technique for computing and histogramming gradients in images based on the orientation and magnitudes of the gradients over some window. For example, Dalal, Navneet and Triggs, Bill, *Histograms of Oriented Gradients for Human Detection*, International Conference on Computer Vision and Pattern Recognition, (2005), discusses one such approach and is incorporated by reference in its entirety.

However, previous approaches to HOGs relied on underlying assumptions regarding the orientation of objects to be identified using HOGs. For instance, prior work may have assumed that human figures would generally appear vertically in a standing position. However, in the case of VHR multispectral remotely-sensed Earth imagery, such assumptions based on suspected orientations may be of very little to no value as the orientation of objects in such imagery may be provided over a plurality of orientations or at random. As such, a rotationally invariant approach to HOGs is proposed and discussed herein.

Figure 13:
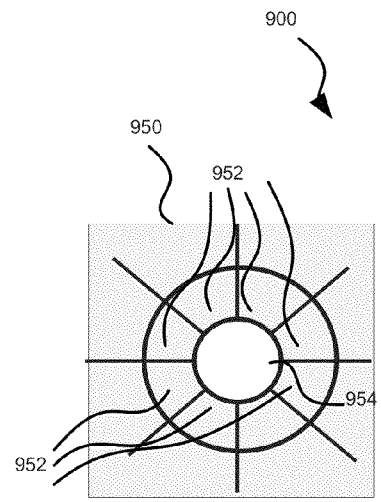
FIG. 13 depicts an embodiment of a plurality of bins for use in a histogram of gradients feature extraction technique.

Specifically, as may be appreciated, a gradient for a specific pixel may include an x (i.e., horizontal) and y (i.e., vertical) component that may be orthogonal to each other. In the rotationally invariant approach to HOG, an image 900 may be represented in gradient domain 950. In the gradient domain 950, N annular bins 952 may be established in addition to a low gradient region disposed in the center 954 of the N annular bins 952. In this regard, each annular bin 952 may correspond with a portion of a ring surrounding the center 954. FIG. 13 depicts an example of one arrangement of the annular bins 952 and center 954 as arranged in a plurality of cells 950. In another embodiment, a second gradient magnitude threshold may be defined to yield 2N+1 bins. Each pixel from an image may be categorized into a bin 952 based on the direction and/or value of a gradient at the pixel as represented in the gradient domain 950.

Figure 14A:
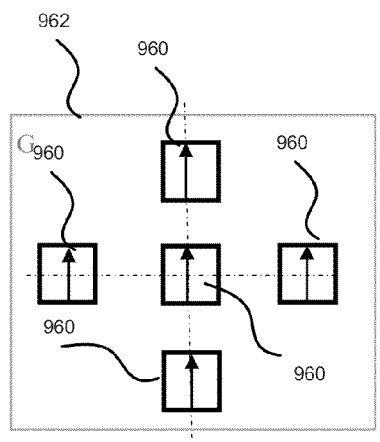
FIGS. 14A and 14B depict an embodiment of a graphical representation of a rotationally invariant histogram of gradients technique applied to an image.

Additionally, attached to a pixel may be a set of P pooling windows 960 with set relative offsets from the pixel as shown in FIG. 14A. Also, a larger window 962, G, may be defined over which the gradients are to be histogrammed. The angular bin $N_i$ from the gradient domain 950 with the largest histogram value (from FIG. 13) is selected as the primary direction. That is, for the example shown in FIG. 13 one of the annular bins 952 is chosen based on the chosen angular bin having the largest histogram value. For each of the pooling windows 960, 2N angular bins may be stored to provide proper oversampling.

Figure 14B:
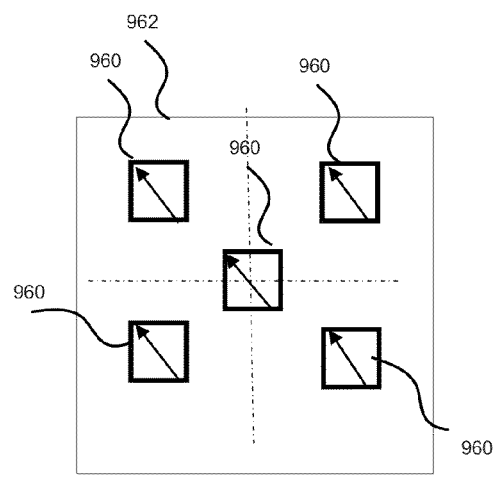

All P pooling windows may be are tied to the primary direction of the window 962 as determined from the selected angular bin 952 with the largest histogram value. Accordingly, shifting the pooling windows 960 to correspond to the primary direction results in only one degree of freedom being lost over all windows when achieving rotational invariance. Once the primary direction is determined from selecting the angular bin 952 with the largest magnitude of histogram, the window 962 is also used to rotate the configuration compared to the primary direction. Accordingly, the pooling windows 960 shift position and the internal orientation of the pooling windows 960 may be rotated, as shown in FIG. 14B.

In an embodiment, integral images may be used to allow all pooling windows 960 to be calculated to generate a HOG for each pooling window 960. The internal orientation of the pooling windows 960 is rotated by shifting the resulting histogram by a fixed number of angular bins 952 determined for the window G 962.

Accordingly, this approach to HOG may provide for rotational invariance. As such, regardless of the orientation of the object to be identified, the HOG produced may be capable of producing useful features associated with the identification of such features. As may be appreciated, for VHR multispectral remotely-sensed Earth imagery, such rotational invariance may be particularly useful given the lack of uniform orientation of features to be identified.

Yet another feature extraction module that may be provided is a Gabor wavelet feature extraction module with rotational invariance. In this regard, while Gabor filters have been utilized in edge detection of images in image processing, the Gabor wavelet feature extraction module described below may provide for rotational invariance, which as described above may be particularly beneficial in the context of VHR multispectral remotely-sensed Earth imagery.

In this regard, the image may be convolved with a Gabor wavelet functions as follows. For the real portion of the function, the following equation may be provided:

$$g(x, y; \lambda, \theta, \psi, \sigma, \gamma) = \exp\left(-\frac{x'^2 + \gamma^2 y'^2}{2\sigma^2}\right)\cos\left(2\pi\frac{x'}{\lambda} + \psi\right) \quad \text{Equation 6}$$

Furthermore, the imaginary component of the function may be represented by the function:

$$g(x, y; \lambda, \theta, \psi, \sigma, \gamma) = \exp\left(-\frac{x'^2 + \gamma^2 y'^2}{2\sigma^2}\right)\sin\left(2\pi\frac{x'}{\lambda} + \psi\right) \quad \text{Equation 7}$$

In both the functions provided above, the values of x' and y' may be provided as follows:

$$x' = x\cos\theta + y\sin\theta \quad \text{Equation 8}$$

$$y' = -x\sin\theta + y\cos\theta \quad \text{Equation 9}$$

In the foregoing equations, $\lambda$ represents the wavelength of the sinusoidal factor of the filter. The value of $\theta$ represents the orientation of the normal to the parallel stripes of the Gabor function. The value of $\psi$ is the phase offset, $\sigma$ is the sigma of the Gaussian envelope, and $\gamma$ is the spatial aspect ratio, which specifies the ellipticity of the support of the Gabor function.

Using the foregoing definitions of the Gabor wavelet functions, a calculation using the module is calculated for each pixel using different values of $\theta$. For instance, a plurality of orientations may be provided for the calculating including, for example, varying values at 22.5 degree increments (e.g., 0 degrees, 22.5 degrees, 45 degrees, 67.5 degrees, 90 degrees, 112.5 degrees, 135 degrees, 157.5 degrees, and 180 degrees). Other intervals may be utilized such as 11.25 degree increments, 45 degree increments, or other appropriate angular increments. In an embodiment, the calculations made for the various values of $\theta$ are made keeping the other variables for the Gabor filter constant. In other embodiments, the calculations may be made at each angular increment using different values for the other variables in the equation to establish a plurality of scales each calculated over the various intervals of $\theta$ as described above.

In any regard, once the values for each angular increment for each pixel have been calculated, the results of the calculations for the various intervals may be further processed to achieve rotational invariance. For example, in an embodiment, the sum of the absolute values of the results for all orientations at a given pixel may be calculated. That is, the sum of all calculations for each value of $\theta$ may be provided. In another embodiment, the sum of the magnitude for the values for the multiplication of convolution values for the Gabor functions that are perpendicular may be provided. That is, for example, the results of the calculation for the orientation (i.e., a $\theta$ value) of 0 degrees may be summed with the result of the calculation for the orientation of 90 degrees, the results of the calculation for the orientation of 22.5 degrees may be summed with the result of the calculation for the orientation of 112.5 degrees, and so on. Further still, the difference between the maximum and minimum values of the magnitudes of the calculations at the various orientations may be calculated for each pixel In this regard, the Gabor wavelet feature extraction module may output any of the foregoing values based on the calculations made at each orientation. In turn, the output may be rotationally invariant as the orientations calculated may account for rotations of features in the VHR remotely-sensed multispectral Earth images examined. In this regard, the various values described above calculated based on the results of the Gabor filter over the various orientation values may result in a rotationally invariant output for each pixel. As described above, such rotational invariance may be particularly useful in the context of remotely-sensed Earth images.

Another feature extraction module 450 that may be provided is a clustering histogram feature extraction module. The clustering histogram feature extraction module may include computing a histogram of cluster values in a predefined area surrounding a pixel. For example, each pixel of an image may be classified into a predefined set of classes. The classes may be established and the pixels may be categorized according to any appropriate technique. For example, in an embodiment a clustering technique such as k-means clustering using Euclidean or Mahalanobis distance may be used. In one particular embodiment for VHR remotely-sensed multispectral Earth images, the classes into which pixels are categorized may correspond to land use and/or land cover classifications defined for the image.

In any regard, once the pixels of the image are classified, for each pixel a histogram of cluster values for all pixels within a predefined distance of the pixel is created. The histogram may be built by counting the number of pixels within the predefined distance from the subject pixel that belong to each particular class. In this regard, the histogram may provide details regarding the nature of the surrounding pixels to any given pixel. In this regard, the histograms for the pixels of an image may provide useful information that may be particularly suited to the analysis of VHR remotely-sensed multispectral Earth imagery.

For instance, in the context of classification of land use or in object recognition, a feature that reflects the surrounding neighborhood of pixels may provide useful insight. For instance, it may be recognized that certain conditions may be recognized from the surrounding pixels when classifying the pixel or identifying an object. As an example, a dock may be surrounded by water such that a pixel belonging to a dock may reflect in the histogram created by the clustering histogram feature extraction module that neighboring pixels include those classified as water. As such, when identifying the dock or classifying the pixel, it may be recognized that a dock is generally surrounded by water. As such, the surrounding pixels may provide insight into properties of a given pixel, and such surrounding pixel information may be captured in the histogram created. Other examples may also be provided such as in an application of land use classification where, for example, the histogram for a number of surrounding pixels may provide insight into the type of land use (e.g., a mix of roads, roof and vegetation may indicate a residential area whereas a lack of vegetation may indicate a commercial area). In this regard, the clustering histogram feature extraction module may provide useful information that may be leveraged in further image analysis.

Another feature extraction module 450 that may be provided is a gray-level co-occurrence matrix (GLCM) module. The GLCM is a tabulation of how often different combinations of pixel gray level values occur in an image. As such, the GLCM may provide textural information regarding an image that may be useful in classification techniques. A full description of an embodiment of a GLCM module may be found in Hall-Beyer, *The GLCM Tutorial Home Page*, Version 2.10 available at http://www.fp.ucalgary.ca/mhallbey/tutorial.htm, the entirety of which is incorporated herein by reference.

In turn, once a GLCM has been generated by the GLCM module, statistics may be generated based on the GLCM. For example, mean, variance, and correlation calculations may be performed. Furthermore, contrast groups may be calculated that are related to contrast use weights related to the distance from the GLCM diagonal. Examples include contrast calculations or "sum of squares variance" for the GLCM, dissimilarity calculations, or homogeneity calculations or "inverse difference moments". Additionally, orderliness groups may be calculated such as angular second moment calculations, maximum probability calculations, or entropy equations.

A number of parameters may be established for creation and use of GLCMs in the GLCM module. For instance, the size of the window over which a GLCM is calculated may be provided as a variable definable by a user. In this regard, the window is preferably large enough to cover features to be identified, but small enough to be localized. For example, calculation of the GLCM in a forest must at least have a window size large enough to identify a tree or calculation of the GLCM in an agricultural field may have a window size roughly correlated to the row spacing of crops planted in the field. Furthermore, the direction of the offset of the GLCM may be definable as may be the bands for which the GLCM is calculated and the measures (e.g., those described above) calculated for the GLCM.

Yet further feature extraction modules 450 may be provided without limitation. An example of a further feature extraction technique that may be utilized include a mean feature approach. In this approach, the mean values for all bands based on a defined kernel are extracted. The kernel may be sized, for example, to be a 3×3 pixel kernel although other values may be used. In this regard, the mean feature module may provide smoothing over the kernel.

Another feature extraction module 450 that may be used includes a digital elevation model (DEM) module that may analyze image data in relation to a DEM. In this regard, some land classes may be tied to relatively flat areas (e.g., crops, wetlands, etc.). A such, a module may generate features based on a DEM corresponding to the geography covered by the image. In addition to providing useful information directly related to land classes, reference to DEM data for a portion of the image may influence illumination of various portions of the image that may be accounted for in processing (e.g., identification of shady areas based on elevation profiles).

As may be appreciated, the foregoing feature extraction models 450 may generate data layers for the feature stack 600 that may each be particularly suited for various classification tasks. In this regard, a user developing a model may be capable of selecting one or more of the feature extraction modules 450 for execution during development of a classification model 462. Further still, at least one parameter related to the execution of a feature extraction module 450 may be adjustable by a user to tailor the feature extraction module 450 to a particular application. In this regard, the selection of certain ones of the feature extraction modules 450 and/or customization of parameters related thereto may facilitate improved processing efficiency as unused and/or unhelpful feature data layers may not be generated based on a user's selection of a limited set of the feature extraction modules 450 for use in generation of the classification model 462.

Returning to FIG. 4, the land classification system 405 may also include a classification compute module 460. The classification computer module 460 may generally be operable to receive supervised training data that is analyzed with respect to one or more feature layers from the feature stack 600 including, for example, image data 411 and/or feature data 452 such as in the form of one or more feature layers from the feature stack 600 described above and shown in FIG. 6 that are retrieved from the data store 410. The analysis of the training data in relation to all or a portion of the feature stack 600 may be used to generate a classification model 462 based on the feature stack 600. As may be appreciated from FIG. 4, the classification model 462 may be stored in the data store 410.

The classification model 462 may include a classification structure based on an analysis of training data provided by a user in relation to the image data 411. As the pixels 650 of the image data 411 may be correspondingly provided with feature layers in the feature stack 600, corresponding pixels in the feature stacks 600 may also be used by the classification compute module 460 in connection with the training data. That is, the feature stack 600 may define one or more attributes of a pixel that may be used in classifying the pixel based on the attributes provided to the classification compute cluster 460. Training data may be received from a user (e.g., from the client interface 430 using a user interface as will be described in greater detail below) that is indicative that certain pixels of the image data 411 belong to a particular class. In this regard, training pixels for each of a plurality of predefined classes may be identified. The classification compute module 460 may analyze the training data to generate the model (e.g., using a supervised learning technique) that includes classification rules generated based on the analysis of the training data in view of the feature stack 600. In turn, once generated the classification model 462 may be used to classify other pixels of the image data 411 for which training data was not provided to classify those pixels using the classification rules of the classification compute module 460 as applied to the feature stack 600 related to those pixels.

The classes into which the classification model 462 classifies pixels may correspond to any appropriate physical property associated with a pixel. For example, as primarily described herein, the classes may correspond to land classification including classes that relate to land classes and/or land use. Examples of land classes may include classes related to the material imaged by a pixel, for example, water, exposed dirt, rock, cropland, grass, forest, tundra, road, roof, asphalt, concrete, etc. Furthermore, land use may correspond to a the manner in which the land is utilized and may include classes corresponding to, for example, human urban growth (e.g., including residential use, industrial use, etc.), agricultural use, etc.

As may be appreciated, classification models 462 may have limited portability or accuracy when classifying images from different geographies and/or images that were acquired at different times (e.g., certain periods of the year corresponding to seasons or the like). In this regard, the classification compute module 460 may be used to generate a plurality of classification models 462 that may each be generated with respect to a particular geographic and/or temporal coverage. For instance, the classification model 462 may be provided with certain classification parameters that may relate to the geography and/or acquisition time/date of the image data 411 used to generate the model 462. In this regard, when the classification compute module 460 applies the classification model 462 to classify image data 411, the metadata for the image data 411 may be used to determine for which image data 411 a given classification model 462 is to be used. For instance, for a given geographic area, a plurality of models 462 may be available corresponding to different seasons. Therefore, metadata of the image data 411 that indicates when the image was acquired may be used to determine the model 462 to be applied to classify image data 411 based on a correlation between a seasonal model 462 and the image acquisition time. Additionally, geographic descriptors for image data 411 may be used to determine an appropriate model 462 for application to the image data 411 to classify pixels of the image data 411 based on the corresponding geographic area related to the pixels.

Furthermore, it may be appreciated that the generation of classification models 462 by users may be done in a collaborative manner. That is, as described above, the client communication module 440 may be operable to communicate with a plurality of instances of a client interface 430 that may, for example, correspond to distributed user terminals over a network. In this regard, different ones of the users at different client interfaces 430 may be operable to access the classification models 462 in the data store 462 to iteratively develop the model 462. That is, a user may build on an existing model 462 generated by another user or use another model 462 as a basis for generation of a new model 462. Accordingly, a different user may modify and/or supplement training data, modify and/or add data layers utilized in the feature stack 600, or other modify parameters to modify an existing model 462. Additionally, as the models 462 may be particular to a geographic area, different users utilizing different client interfaces 430 may select different geographies for which to build a classification model 462. In this regard, the potential collaborative nature of the land classification module 405 may allow for a iterative, piecemeal approach to a global land classification layer.

One potential approach to creation of the classification model 462 may include the use of a decision tree approach to supervised machine learning. The basic algorithm for such a decision tree may be a greedy algorithm optimization problem. The approach may include constructing a top-down recursive tree that is optimized in an divide-and-conquer manner. That is, at the initiation of the algorithm, all training examples (i.e., each pixel having attributes derived from the feature stack 600) may be provided at the root such that each example constitutes a node of the decision tree. Attributes may be categorical. If attributes are continuous-valued, they may be discretized in advance or all thresholds of the attributes may be considered. Examples from the training data (i.e., positively identified pixels belonging to a class or negatively identified pixels that do not belong to one or more classes) may be partitioned recursively based on selected attributes. That is, examples with common attributes may be partitioned to develop a decision or branch of the decision tree for classification based on the attribute subject to the partition. Test attributes may be selected on the basis of a heuristic or statistical measure such as, for example, information gain as will be described in greater detail below. In turn, conditions for ceasing the partitioning may be provided such as, for example, when all samples for a given node belong to the same class or when there are no remaining attributes for further partitioning. In this latter regard, majority voting may be provided for classifying the resulting examples remaining in a partition. One example of an output of a decision tree classification model 462 that may be provided as an output 800 of a decision tree approach by the classification compute module 460 is shown in FIG. 11.

Figure 11:
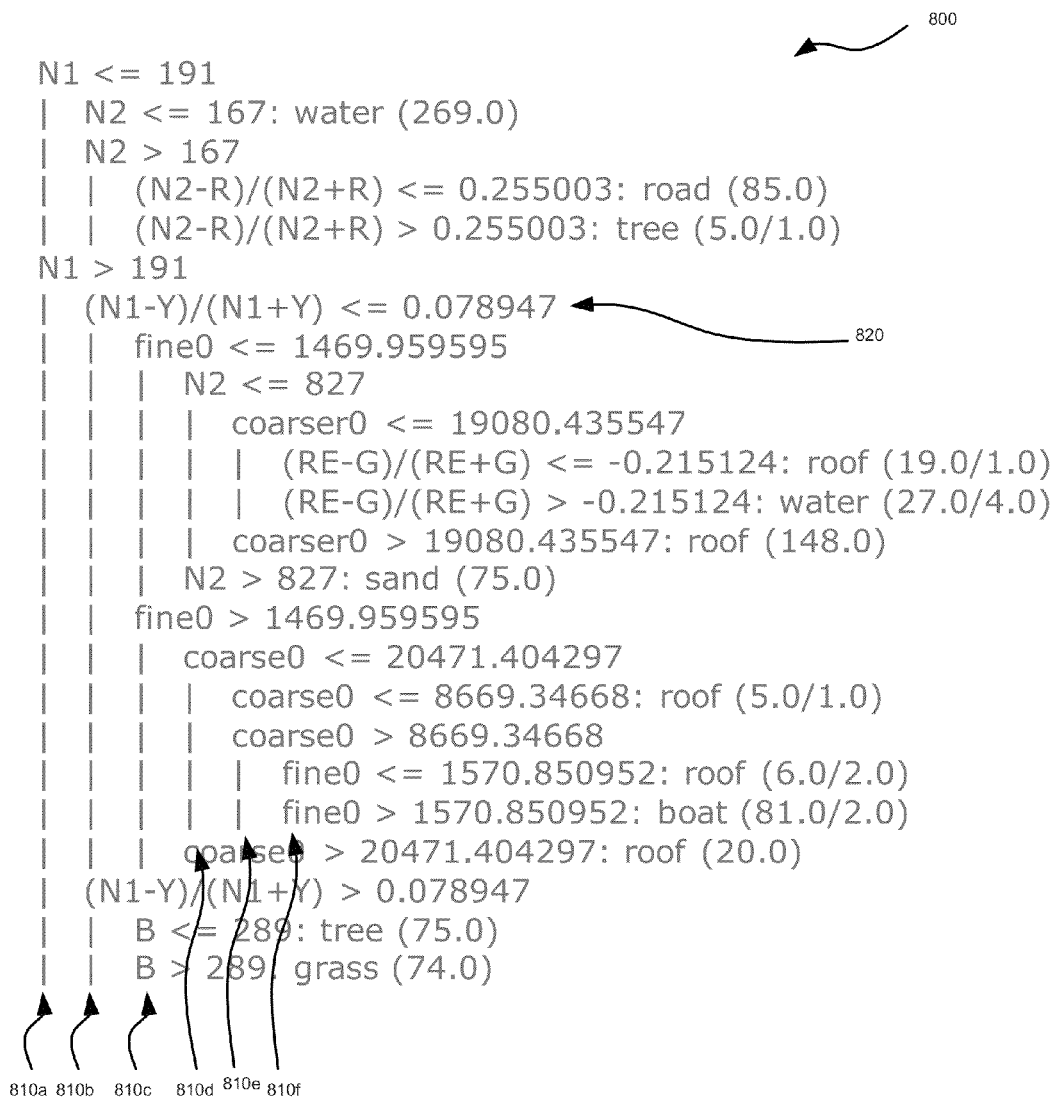
FIG. 11 depicts an embodiment of a graphical representation of a classification model that may be generated that is operable to classify image data.

In FIG. 11, the output 800 includes a plurality of decision levels 810a-810f. Each line 820 of the output 800 may include a decision based on one or more features or attributes of the pixel being classified. For instance, at level 810a, a near infrared 1 band (N1) of the pixel to be classified is scrutinized to determine if the gray value for the pixel is greater than or less than or equal to a value of 191. In the case where the gray value for the N1 band is greater than a value of 191, the classification compute module 460 moves to the next level, level 810b, to continue the analysis. For instance, at the next level 810b, for pixels with a gray level in the N1 band of greater than 191, it may be determined if a ratio of the N1 band to the yellow band (Y) is less than or equal to the value of 0.078947. Depending on the value of the pixel being evaluated, the classification compute module 460 may move to the next level 810c at a row corresponding to the value of the ratio of the N1 and Y band. In turn, features of the pixel may be analyzed in this branched analysis method until a determination of a class for the pixel is determined.

As described above, when deciding when to split examples or partition examples based on an attribute in the tree based on a decision may be determined using one of a number of approaches for determining how and when to split an attribute as a decision in the tree structure 800. For example, an information gain approach, a gain ratio approach, or a Gini index approach may be provided. For the information gain approach, a probability value $p_i$ may be defined as the probability that an arbitrary example in D (i.e., the set of all pixels of the training data) belongs to class $C_i$ (i.e., a given class). In this regard, the value for $p_i$ may be estimated as:

$$p_i = \frac{|C_{i,D}|}{|D|} \quad \text{Equation 10}$$

where $C_{i,D}$ is the total number of examples in the class $C_i$. Accordingly, the expected information needed to classify an example in D prior to a split may be provided as:

$$Info(D) = -\sum_{i=1}^{m} p_i \log_2(p_i) \quad \text{Equation 11}$$

In turn, the information needed to classify D after a split may be calculated as:

$$Info_A(D) = \sum_{j=1}^{v} \frac{|D_j|}{|D|} \times Info(D_j) \quad \text{Equation 12}$$

In turn, the information gained by partitioning examples based on an attribute A may be calculated as:

$$Gain(A) = Info(D) - Info_A(D) \quad \text{Equation 13}$$

In turn, the information gain when choosing splits may be optimized over the classes or a minimum threshold for additional information gain may be established such that further partitioning of examples in the tree for an attribute that add information below the threshold may not occur.

Another approach to determining when to split examples in the tree based on an attribute A (e.g., from the feature stack 600) may be the ratio gain approach. In this approach, the information gained by making a split may be defined as:

$$SplitInfo_A(D) = -\sum_{j=1}^{v} \frac{|D_j|}{|D|} \times \log_2\left(\frac{|D_j|}{|D|}\right) \quad \text{Equation 14}$$

In turn, the gain ratio for splitting based on attribute A may be defined as:

$$GainRatio(A) = \frac{Gain(A)}{SplitInfo(A)} \quad \text{Equation 15}$$

This ratio may be maximized at each step such that the greatest contribution to the information may determine which attribute is used for each subsequent split in the tree to partition examples based on a attribute A.

In the context of continuous-valued attributes, the best split point for an attribute A may also be determined. In this regard, the values of A may be sorted in increasing order. Typically, the midpoint between each pair of adjacent values is considered as a possible split point of the attribute or:

$$SP_A = \frac{(a_i + a_{i+1})}{2} \quad \text{Equation 16}$$

The point with the minimum expected information requirement for A is selected as the split point for A where D1 is the set of examples in D satisfying the requirement of A less than or equal to the split point and D2 is the set of examples in D satisfying the requirement of A greater than the split point.

Additionally a Gini index approach to a split may be taken. In this approach, a Gini index (gini(D)) may be defined as:

$$gini(D) = 1 - \sum_{j=1}^{n} p_j^2 \quad \text{Equation 16}$$

where $p_j$ is the relative frequency of class j in D. A reduction in impurity may be calculated as:

$$\Delta gini(A) = gini(D) - gini_A(D) \quad \text{Equation 17}$$

In this regard, it may be appreciated that the foregoing approaches to selection measures for determining how to partition examples based on an attribute or, in other words, where to insert a decision into the tree, may have certain compromises. For example, the information gain approach may be biased towards multivalued attributes. The gain ratio approach tends to prefer unbalanced spits in which one partition is much smaller than the others. The Gini index is also biased to multivalued attributes and may have difficulty in determining attribute selection when the number of classes is large. As such, the Gini index tends to favor tests that result in equal-sized partitions and purity in both partitions.

In other embodiments, other attribute selection methods may be employed in the classification compute module 460. Examples include, but are not limited to, a CHAID algorithm, a C-SEP algorithm, a G-statistic algorithm, a minimal description length (MDL) algorithm, a multivariate split algorithm (e.g., a CART algorithm) or other appropriate approach.

Additionally, "pruning" approaches to the decision tree may be provided to improve the resulting classification model 462 based on creation of a decision tree. For instance, a scenario where a generated tree overfits the training data may be generated where too many branches are provided that reflect anomalies due to noise or outlying data values. In this regard, prepruning or postpruning techniques may also be used. In prepruning, tree construction is halted early by not spitting a node if the result would provide a measure below a threshold (e.g., providing a minimum information gain or the like). In postpruning, branches of the decision tree may be removed once the decision tree is generated. Additionally, in the decision tree processing, other enhancements may be provided such as attribute construction or attributing attributes for missing attribute values.

Another approach to generation of a classification model 462 by a classification compute module 460 includes use of an artificial neural network. In a neural network, the inputs to the network may correspond to the attributes measured from each training value. These attributes may be weighted and fed together into a hidden layer. In this regard, during the learning process, the network may adjust the weights to predict the correct class label of the training examples. In turn, the network may perform nonlinear regression that approximates a function that classifies the training examples.

Still another approach to machine learning that may be used by the classification compute module 460 to generate a classification model 462 is the use of a support vector machine (SVM). The SVM uses a nonlinear mapping to transform original training data into a higher dimension. In the new dimension, the SVM determines a linear optimal separating hyperplane or "decision boundary." With an appropriate nonlinear mapping to a sufficiently high dimension, data from two classes can be separated by a hyperplane. The SVM finds the hyperplane using support vectors and margins.

Furthermore, other appropriate machine learning approaches may be additionally or alternatively used to generate classification models 462. Examples include, but are not limited to, instance-based learning, maximum likelihood approaches, genetic algorithms, logistic regression, active learning, transfer learning, classifier ensembles, bootstrap aggregation, boosting (e.g., using the Adaboost algorithm), Random Forest algorithms, or other appropriate machine learning techniques without limitation.

In this regard, it may be appreciated that for different models 462 or for different portions of a given model 462, different machine learning approaches may be utilized. As such, the use of machine learning approaches may be parameterized such that a user may select the approach and/or variable values related to the approach to tailor the machine learning process to the model or model portion to be constructed. In this regard, approaches to model evaluation may be provided to assist in selecting and/or tailoring a model 462 or the approach used to generate the model 462. As such, a model evaluation module 490 may be provided.

Accordingly, the model evaluation module 490 may be operable to evaluate classification modules 462 using a test set of examples that may be generated based on training data received by a user. For example, a test set of class-labeled examples instead of training data may be provided to assess the accuracy of the model 462 and/or evaluate the approach used to generate the model 462. Thus, methods may be executed to evaluate a classifier's accuracy or compare classifiers. Accordingly, a classifier accuracy value may be defined that relates to the recognition rate of the model 462. The classifier accuracy value may be the percentage of test set examples that are correctly classified. The classifier accuracy value may be defined as:

$$\text{Accuracy} = \frac{(TruePositives + TrueNegatives)}{AllTestSet} \quad \text{Equation 18}$$

Furthermore, an error rates may be provided as:

$$\text{Error Rate} = 1 - \text{Accuracy} \quad \text{Equation 19A}$$

or $$\text{Error Rate} = \frac{(FalsePositives + FalseNegatives)}{AllTestSet} \quad \text{Equation 19B}$$

Additionally, one or more precision measurements may be provided. These measurements may be defined as:

$$\text{Precision} = \quad \text{Equation 20}$$
$$\frac{TruePositive}{(TruePositive - FalsePositive)} - \text{Consumer's Accuracy}$$

$$\text{Recall} = \quad \text{Equation 21}$$
$$\frac{TruePositives}{(TruePositives + FalseNegatives)} - \text{Producer's Accuracy}$$

$$FMeasure = 2 \times Precision \times \frac{Recall}{Precision + Recall} \quad \text{Equation 22}$$

Additionally, a receiver operative characteristic ROC may be calculated as:

$$TruePositiveRate = Recall \quad \text{Equation 23}$$

$$FalsePositiveRate = \frac{FalsePositive}{FalsePositive + TrueNegative} \quad \text{Equation 24}$$

Also, a kappa coefficient may be calculated that takes into account the probability of a chance or random agreement. The kappa coefficient may be provided as:

$$\kappa = \frac{(Pr(a) - Pr(e))}{(1 - Pr(e))} \quad \text{Equation 25}$$

where Pr(a) is the observed agreement (or accuracy) and Pr(e) is the probability of a chance agreement.

The generation of the test set of data may be provided in a number of ways. For example, in a holdout method, training data is randomly partitioned into two sets for model construction and accuracy estimation, respectively. For instance, the training data may be portioned randomly such that, for example, two thirds of the training data belongs to the training set used for model construction and one third of the training data belongs to the test set for accuracy estimation. Another approach may be cross-validation where the training data is randomly partitioned into k mutually exclusive subsets each of approximately the same size. For example, ten is a common value used for k. At an iteration i, one of the subsets $D_i$ is used as a test set and all others are used as the training set.

One variation on the cross validation approach is for sets of small size, where for each iteration, one of the samples is left out of the training set and used for testing, which is known as the "leave-one-out" approach. Another approach to cross validation is the stratified cross validation approach where each class distribution in each set $D_i$ is approximately same as that in the full data set D. Additionally, a bootstrap approach may be provided that samples the training examples uniformly with replacement.

Accordingly, confidence intervals may be calculated for a model 462. For instance, an estimation of the confidence interval may be provided using a t-test. In this regard, if only one test set is available the comparison may be pairwise. Accordingly, for the i-th round of cross validation with k=10, the same cross partitioning is used to obtain the error rate for a first model ($M_1$) and a second model ($M_2$) to obtain $\overline{err}(M_1)$ and $\overline{err}(M_2)$, which are the average of the error rate over ten rounds for each model respectively. A formula to compute a t-test with t-statistic with k1 degrees of freedom may be provided as:

$$t = \frac{\overline{err}(M_1) = \overline{err}(M_2)}{\sqrt{\frac{\text{var}(M_1 - M_2)}{k}}} \quad \text{Equation 26}$$

where $$\text{var}(M_1 - M_2) = \frac{1}{k}\sum_{i=1}^{k}\left[\frac{err(M_1)_i - err(M_2)_i -}{(\overline{err}(M_1) - \overline{err}(M_2))}\right]^2 \quad \text{Equation 27}$$

In the case where two sets of test data are available, a non-paired t-test may be used where:

$$\text{var}(M_1 - M_2) = \sqrt{\frac{\text{var}(M_1)}{k_1} + \frac{\text{var}(M_2)}{k_2}} \quad \text{Equation 28}$$

and $k_1$ and $k_2$ are the number of cross-validation samples used for $M_1$ and $M_2$ respectively.

In turn, a t-distribution table for critical values may be used to determine significance levels between $M_1$ and $M_2$. For instance, a significance level of 0.05 or 5% means $M_1$ and $M_2$ are significantly different for 95% of the population. A confidence limit may be defined as z=sig/2. Accordingly, to determine if $M_1$ and $M_2$ are significantly different, t may be computed and a significance level established (e.g., sig=5%). In this regard, a t-distribution table may be consulted to find a t value corresponding to k-1 degrees of freedom (e.g., 9 in the case where k=10. For a symmetric t-distribution, the upper value is typically used. In this regard, the value for the confidence limit may be looked up. If t>z or t<-z, then the mean error rates of $M_1$ and $M_2$ are the same and there is a statistically significant difference between $M_1$ and $M_2$. Otherwise, it may be concluded that any difference between the models is due to chance or randomness.

The land classification module 405 may also include a post classification processing module 480. In this regard, once image data 411 has been classified into one of the plurality of land classes by the classification compute module 460, the classified image data 411 may be further analyzed to improve classification accuracy. In this regard, one or more post classification rules may be generated (e.g., collaboratively via a plurality of users) to modify classifications of the image data 411 after the data has been classified by the classification compute module 460.

In this regard, post classification rules may include, for example, a minimum mapping unit rule, a "surrounded by" rule, a topological relation rule, a majority analysis rule, and/or a smoothing rule. However, other post classification processing techniques may be applied without limitation. The minimum mapping unit rule may dictate that a cluster of classified pixels (e.g., where at least one pixel of a common classification borders at least one other pixel of common classification to form a group of adjacent similarly classified pixels) have a minimum unit size. For instance, certain classes (crops, tidal flats, wetlands, etc.) may have a larger minimum unit size required than other classes (e.g., roads, roofs, shadows, trees, etc.). This may reflect an understanding that certain classes are likely to be of a minimum threshold size. In this regard, if the minimum unit size is not attained, the pixels may be reclassified. For instance, a group of pixels classified as tidal marsh that does not exceed the minimum unit size may be reclassified based on, for example, surrounding pixels classifications or a revision to the classification model 462 used to classify the pixels originally.

In another example, a topological relations rule may be provided. In this regard, pixel classifications of a certain size (e.g., less than the minimum unit size) that are completely or partially surrounded by another class of pixels may be dissolved to become a part of the surrounding pixel classification. As an example, in an image with a group of pixels grouped as tidal flat that is completely surrounded by pixels classified as road may be dissolved to become classified as road in accord with the surrounding pixels. Various heuristics may be provided for determining how the pixels may be changed in relation to the topological relation rule including, for example, dissolving pixels into the class of pixels that includes the largest border with the pixels to be dissolved, dissolving pixels into the largest group of similarly classified pixels adjacent to the pixels to be dissolved, reclassification with the model 462 originally used to classify the pixels while omitting the original class assigned as an option for classification, etc. In this regard, the topological relations rule may include parameters related to the types of classes subject to the rule, the size of the group of classified pixels to which the rule is applied, the identity of the pixels into which pixels are to be dissolved, etc.

Another post classification processing module 480 may include a majority processing rule. In the majority processing rule, a pixel for a given class is reclassified if surrounding pixels in a kernel surrounding a given pixel belonging to another class. For instance, a pixel may be reclassified if all other pixels in the kernel belong to another class or if a majority of pixels in the kernel belong to the other class. The majority processing rule may include majority analysis processing with kernel sizes determined per class. For instance, larger kernel sizes may be provided for certain classes (e.g., crops, tidal flats, grass, wetlands, etc.) and smaller kernel sizes may be provided for other classes (e.g., roofs, roads, shadows, trees, etc.). In this regard, the majority processing rule may smooth boundaries and dissolve long regions. Additionally or alternatively, other smoothing techniques may be applied without limitation to further smooth the classification boundaries of pixels using the post classification processing module 480. Again, the post classification processing module 480 may be selectively applied by a user such that various processing may be iteratively conducted by different users selecting a different one or more post classification processing rules for application after classification of image data 411 using a classification model 462.

As may further be appreciated from FIG. 4, the land classification module 405 may include a database management module 470. The database management module 470 may act to direct interaction between the land classification module 405 (e.g., various components thereof including the image data server 420, the feature extraction module 450, and/or the classification compute module 460) and the data store 410. This may be particularly relevant in the case where a plurality of client interfaces 430 are operable to access and/or utilize the land classification module 405 simultaneously.

Figure 5:
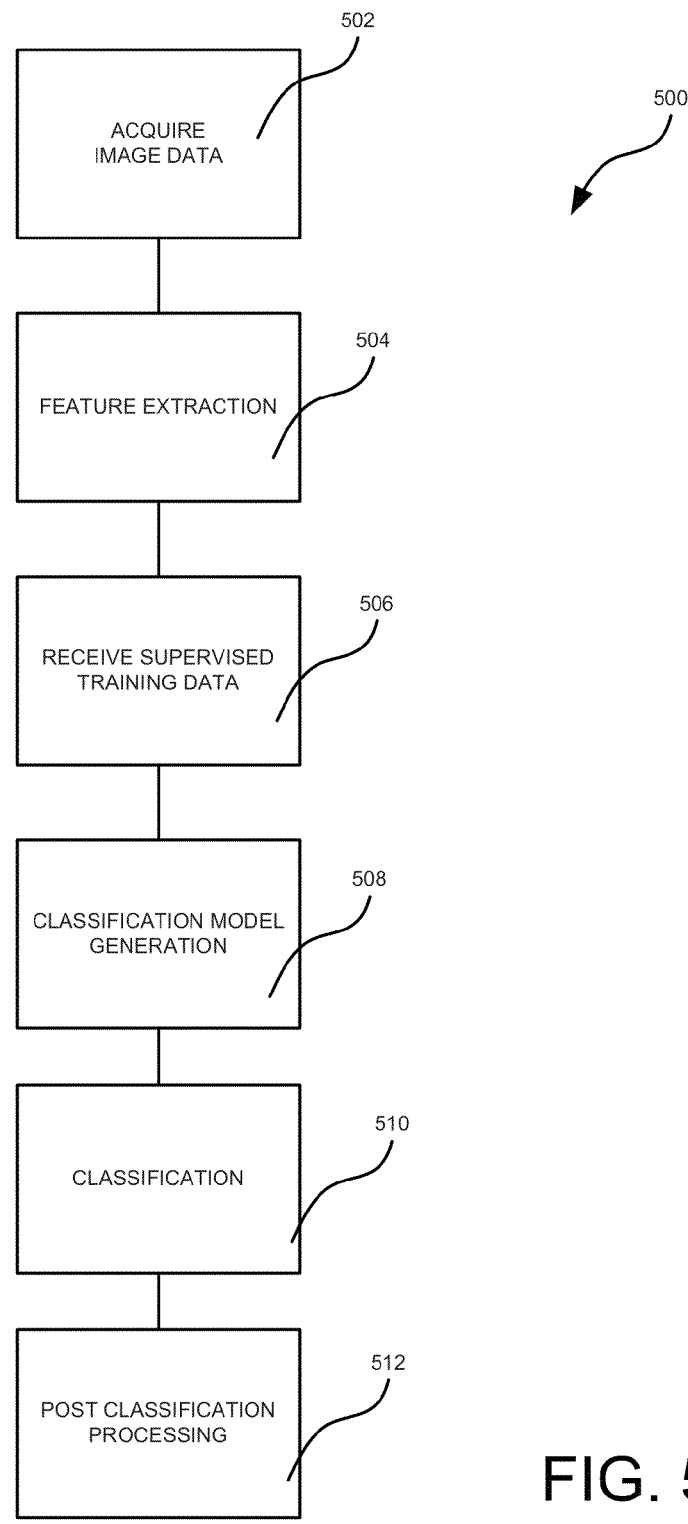
FIG. 5 is a flow chart of an embodiment of a method for land classification.

With further reference to FIG. 5, an embodiment of a method 500 for land classification (e.g., utilizing the land classification module 405) is depicted. The method 500 may begin with image acquisition 502. As described above, the image acquisition 502 may include any appropriate means for acquiring image data 411 for analysis. In one embodiment, the image acquisition 502 may include acquiring a plurality of bands of spectral data for an image using a satellite imaging system 415. The data acquisition 502 may also include preprocessing of image data 411 such as, for example, orthorectification, atmospheric correction, normalization, etc.

In any regard, the image data 411 acquired from the image acquisition 502 may undergo feature extraction 504. As described above, feature extraction 504 may include any processing of the image data to generate data layers for the image data 411 including, for example, extracting individual spectral bands, performing comparative calculations using the spectral bands, generating textural or morphological data, and/or any one or more of the above described feature extraction modules without limitation. In this regard, the feature extraction 504 may include selection of one or more feature extraction modules 450 to be applied to the image data 411 and/or selection of one or more parameters related to a feature extraction module 450 as discussed above. In any regard, the feature extraction 504 may result in generation of a plurality of data layers for the image data 411 (e.g., in the form of feature data 452).

The method 500 may also include receiving supervised training data 506. As stated above, the training data may be received from a client interface 430 by receiving data from a user that includes an indication of various pixels that belong to one or more class. As described above, the classes may be generated by the user such that the user may generate a class and provides training pixels belonging to the class or may comprise predetermined classes for which the user provides training pixels. The user may provide the training data by way of a client interface 430, which may include a user interface for receiving the training data.

It may be appreciated that the feature extraction 504 may be relatively taxing on computational resources. In this regard, the feature extraction modules 450 used to generate a particular classification model 462 may first be applied to produce a feature stack 600 only for those portions of the image data 411 for which training data has been received. That is, the feature extraction 504 may be carried out only to pixels for which training data has been provided so that the feature stack 600 provided to the classification compute module 460 corresponds to only the trained pixels. In turn, the model 462 may still be generated. Thus, the computational resources needed to construct the model 462 may be minimized as feature data relating only to those portions of the image data 411 used to generate the module may be generated. In turn, upon application of the model 462 to a larger portion of the image data 411 (e.g., the full scene including pixels for which training data has not been provided), the feature extraction module 450 may execute to produce the feature stack 600 for the full imagery. Thus, the feature data may be computed on an "as needed" basis to conserve processing resources. Furthermore, it may be appreciated that many feature extraction modules 450 may include highly parallel computations that may be particularly suited for execution on a GPU.

Figure 7:
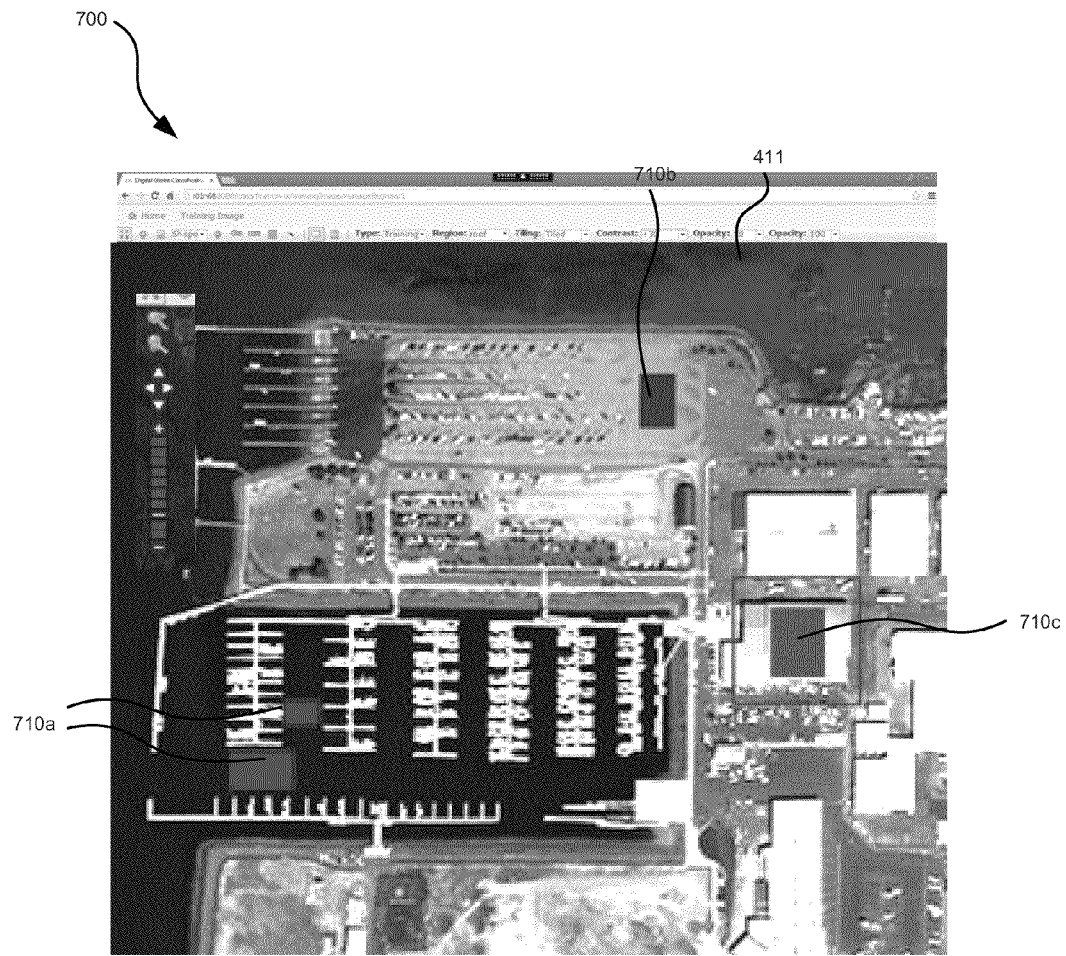

With further reference to FIGS. 7-10B, embodiments of screen shots of screens of a user interface 700 are shown. With respect to FIG. 7, image data 411 may be displayed to a user. For example, a human visible image comprising red, blue, and green band information may be displayed. In turn, tools may be provided to the user by way of the user interface 700 to select pixels that belong to a class. For instance, as shown in FIG. 7, a user may have provided a number of regions 710a-710c corresponding to different classes to be identified from the image data 411. For example, regions 710a may correspond to a region identified by the user corresponding to a class "water." Region 710b may correspond to a region identified by the user corresponding to a class "concrete." Region 710c may correspond to a region identified by the user corresponding to a class "roof." In this regard, it may be appreciated that predefined classes may be provided for which users are tasked to identify positive and/or negative examples of pixels belonging or not belonging to a class. Additionally or alternatively, a user may identify regions of pixels to define a new class, which may or may not be defined by a user.

For instance, a region of pixels for which the user is not sure of the class may identify the pixels belonging to the undefined class such that similar pixels may still be classified even if the class definition is to be determined later. Furthermore, while not shown in FIG. 7, a user may also provide negative examples in the form of a region identified as not belonging to one or more categories. Further still, for a given class, multiple instances of training data for the class in different conditions may be provided. For example, for the class "roof," training data may be provided for "shaded roof" corresponding to pixels of a roof that are in shade and "unshaded roof" for corresponding to pixels of a roof that are in direct sun. In this regard, it may be that pixels identified as "shaded roof" and "unshaded roof" may each be attributed to a parent class of "roof" as the user may not be interested in divisions between portions of roof that are shaded or unshaded. That is, while individual pixels corresponding to shaded roofs and unshaded roofs may be separately identified using the separately provided training data, the separately identified pixels may be aggregated into a single class, i.e., roof, without regard to whether shaded or unshaded. This may be particularly useful in the context of VHR remotely-sensed multi-spectral imagery where cloud cover or the like is present to identify training data for shaded and unshaded pixels from a single class. Accordingly, even in identifying pixels from data where cloud cover may be present, an accurate classification of pixels may be made despite potential variations in what pixels are in shade and which are not.

Figure 8:
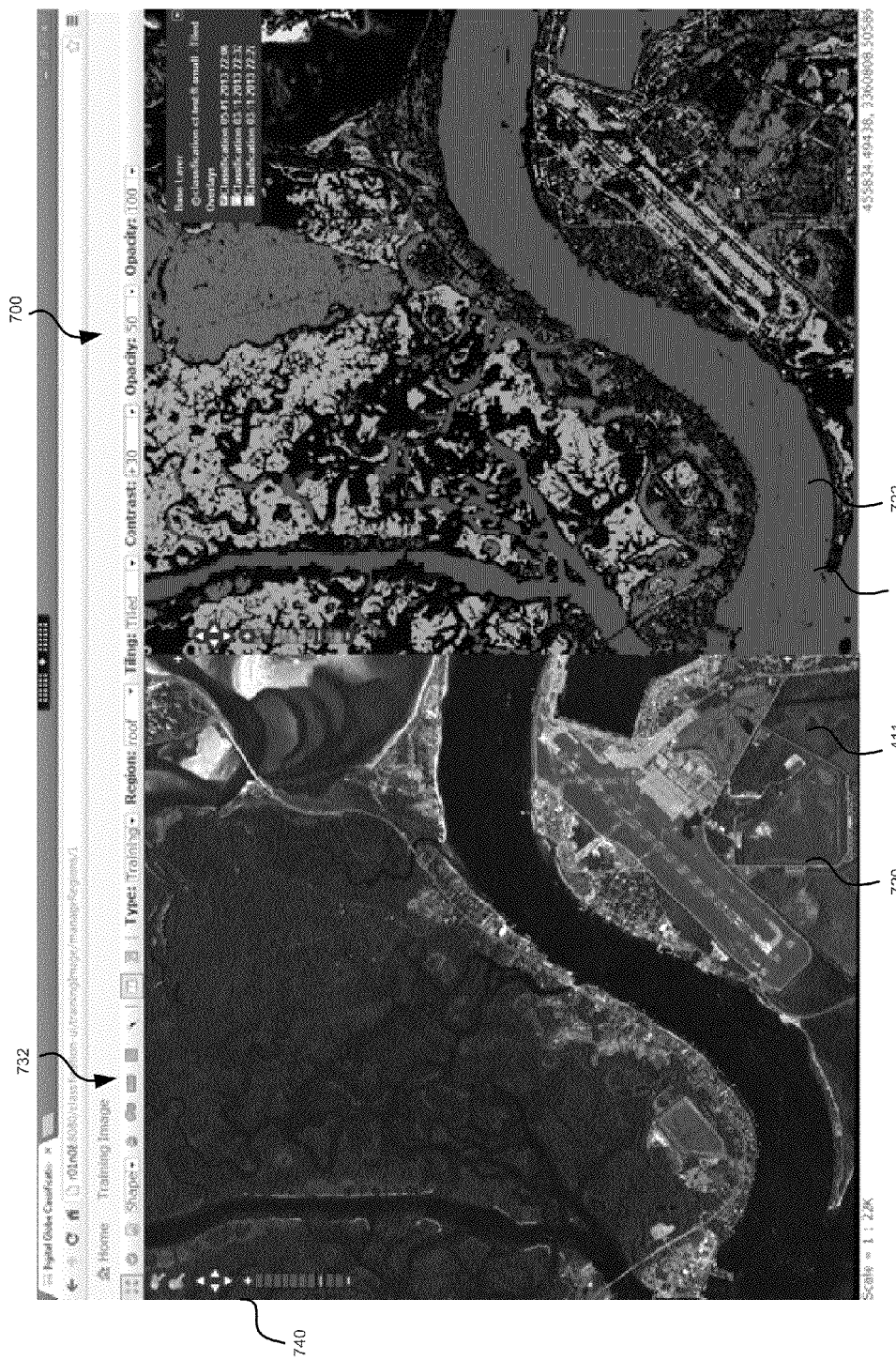

FIG. 8 depicts another screen of a user interface 700. As may be appreciated, the user interface 700 may include a plurality of windows. For instance, human visible image data 411 may appear in a first window 720 and a classification map overlay 730 may appear in a second window 722. In this regard, the user may be capable of viewing image data 411 and the classification overlay 730 side by side. Accordingly, in an embodiment, the method 500 of land classification may be performed for a portion of image data 411 for verification of the sufficiency of training data, a classification module 462, or other parameters. In this regard, as may be appreciated from FIG. 8 depicting the user interface 700 the image data 411 presented to the user may comprise a limited portion of a larger scene to which a completed classification regime (e.g., including a selection of feature extraction module, classification model and/or post classification rules to be applied) is to be used. In this regard, when applied to a large scene, the processing time required to complete the processing may be significant. As such, the method 500 may be performed on a more limited portion of the image data 411 so that the user may perform real time verification of a classification regime prior to executing the classification regime on an entire scene to be classified by viewing the image data 411 and classification overlay 730 side by side.

The user interface 700 may also include navigational tools 740 that may allow a user to manipulate the portion of the image data 411 and/or a corresponding portion of the classification overlay 730. For instance, panning, zooming, or other tools (e.g., a selector for which spectral bands, classifications, etc. should be displayed) may be provided. The zooming functionality may be especially important when selecting regions 710 of training data. This is especially evident comparing the images of FIGS. 7 and 8 where it is clear that the regions 710 may correspond to relatively small areas of the image that are more easily defined at high zoom levels.

The user interface 700 may also include a region selector tool set 732. The region selector tool set 732 may allow a user to change the manner and/or shape of a region to be added to the image data 411 to define training data. For instance, a polygon, rectangle, or point tool may be provided that allow for differently shaped regions to be created. A "stamp" tool may be provided that allows a region of a fixed size to be created. Once the "stamp" region is added to the image data 411, the region may be resized. A "magic wand" tool may also be provided that selects a region based on similarities of adjacent pixels (e.g., based on standard deviation, max area parameters, or the like) as is known in the art. Additionally, the region selector tool set 732 may include histogram-based thresholding to subselect pixels from a polygon or rectangle.

The user interface 700 may also have project management functions. These functions may allow users to load, save, and create new classification models 462. The project management functions may also provide current job status and allow users to set preferences for a model or for global model creation. The project management functions may also allow a user to upload and/or select image data 411 for which to create a model 462.

Figure 9:
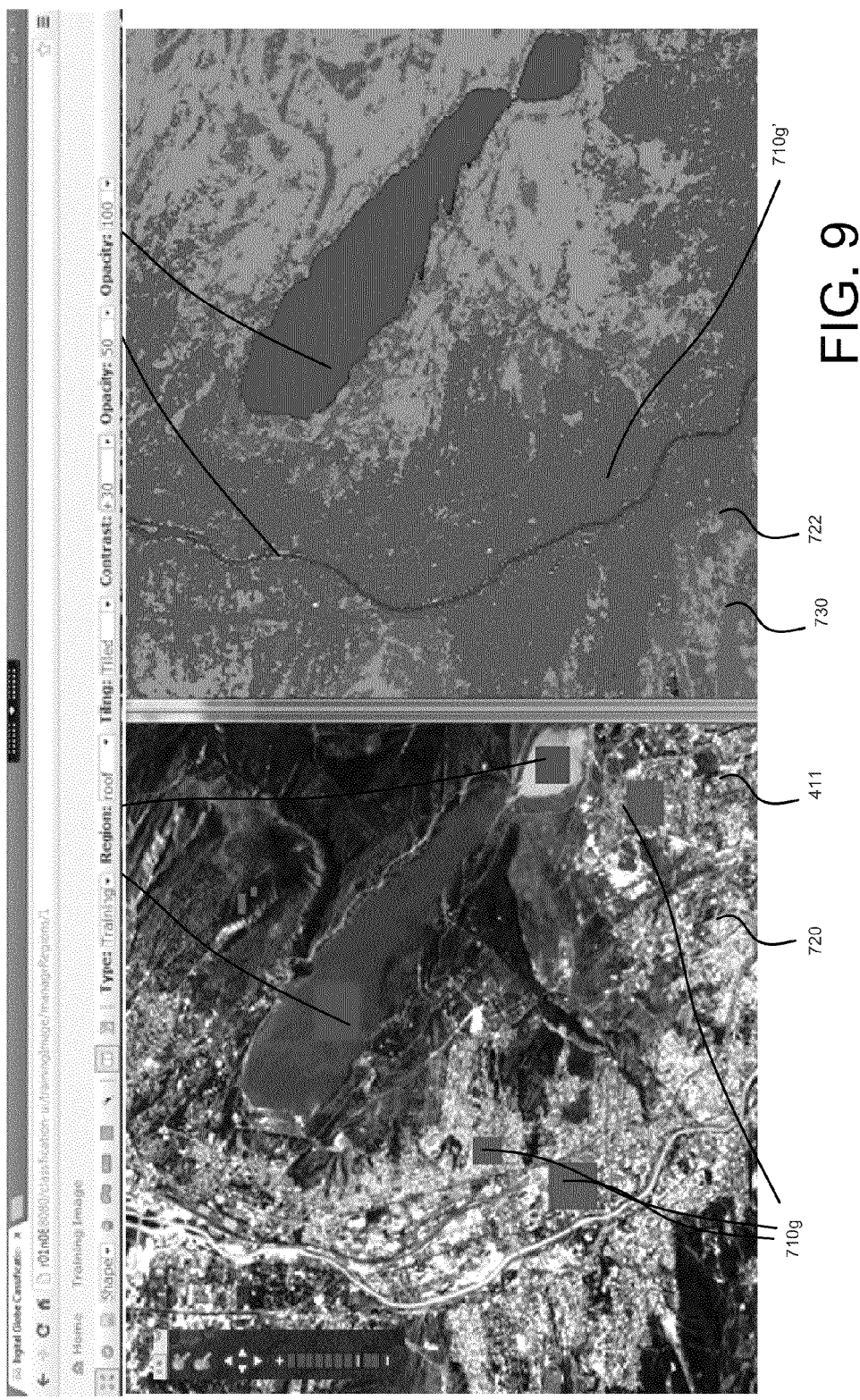

With further reference to FIG. 9, it may be appreciated that the side by side viewing of image data 411 in a first window 720 and a classification overlay 730 in a second window 722 may include regions 710 of identified training data that are identified in the first window 720. In this regard, regions 710g may be shown in a first color indicative of an association with a first class. In turn, a first class designator color 720g' may be presented in the class overlay 730 that corresponds with the first color of the region 710g. In a similar regard, regions 710h may be shown in a second color indicative of an association with a second class. In turn, a second class designator color 720g' may be presented in the class overlay 730 that corresponds with the second color of the region 710g. In this regard, a user may review the class overlay 730 generated based on the regions 710g, 710h of training data to evaluate the accuracy of the class overlay 730. As such, the user may delete, add, or modify the regions 710g, 710h to improve the accuracy of the class overlay 730.

Figures 10A, 10B:
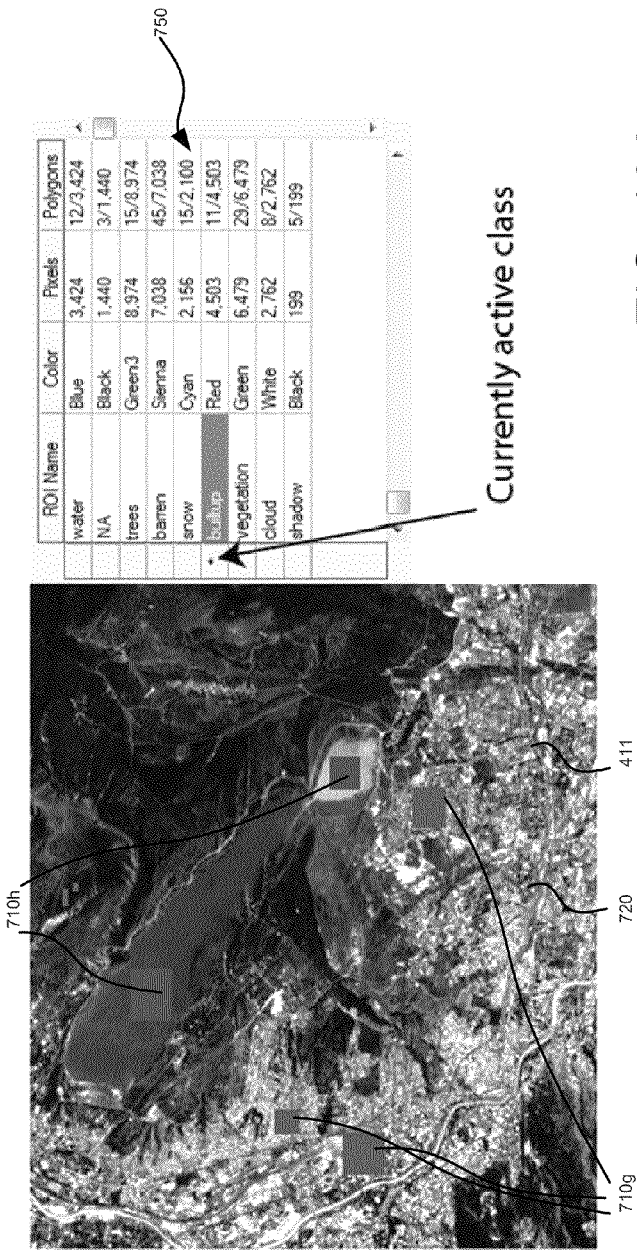

FIGS. 10A and 10B depict various region metrics 750 that may provide information to the user about the regions that have been created and properties related thereto. For instance, in FIG. 10B, a set of region metrics 750 is includes that provides each class name, the color designated to the class, the number of pixels of training data received for the class, and the number of polygons created to define the total number of pixels of training data. In FIG. 10B, a histogram 752 is depicted that displays the relative number of pixels of training data that has been provided for each particular class available. In this regard, the region metric 750 and histogram 752 may assist a user in determining which of the classes would benefit from additional training data.

In any regard, once the training data has been received, the method 500 may include generation 508 of a classification model 462 based on the training data. As described above, the generation of the classification model 462 may include performing a supervised machine learning technique with respect to the training data to generate a classification model 462 for application to image data 411 to classify pixels thereof. Examples of supervised machine learning algorithms that may be applied to generate the classification model 462 may include any of the foregoing approaches described. In any regard, the resulting classification model 462 may include a classification process that may be based on one or more portions of image data 411 and/or feature data 452 to determine for a given pixel of image data 411 a class into which the pixel should be classified. As such, the method 500 may further include classification 510 of image data 411 to classify pixels thereof. The image data 411 may include a complete scene of satellite image data or a more limited portion (e.g., as defined by a user). The method 500 may also include post classification processing 512 that may include application of one or more of the post classification rules described above.

In an embodiment, the method 500 may be performed for a portion of image data 411 for verification of the sufficiency of training data, a classification module 462, or other parameters. In this regard, as may be appreciated from the foregoing discussion of the user interface, a portion of the image data 411 may be presented to a user. In this regard, the image data 411 presented to the user may comprise a limited portion of a larger scene to which a completed classification regime (e.g., including a selection of feature extraction module, classification model and/or post classification rules to be applied) is to be used. In this regard, It may be appreciated that when applied to a large scene, the processing time required to complete the processing may be significant. As such, the method 500 may be performed on a more limited portion of the image data 411 so that the user may perform real time verification of a classification regime prior to executing the classification regime on an entire scene to be classified.

The method 500 in turn may include classifying 510 pixels of the image into a class based on a generated or selected classification model 462. That is, attributes of a given pixels that, for example, may be taken from the data stack 600 may be analyzed with respect to the classification model 462 to determine which class the pixel is to be classified. Further still, the method 500 may include post classification processing 512 including application of one or more post classification processing rules as described above.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A land classification system operable for analysis of very high resolution (VHR) remotely-sensed multispectral Earth imagery, comprising:
    an image store containing image data corresponding to VHR remotely-sensed multispectral Earth images;
    at least one feature extraction module in operative communication with the image store, the feature extraction module being operable to produce feature data regarding at least a portion of image data;
    a feature stack comprising the image data and the feature data;
    a client interface operable to receive training data regarding at least one or more pixels of the image data from a user regarding at least one class to which the one or more pixels belong;
    a classification compute module operable to generate a classification model at least in part based on a portion of the feature stack corresponding to the one or more pixels and the training data, wherein the classification model relates to classification of pixels of image data into one or more classes; and
    a plurality of feature extraction modules each selectively applicable to image data by a user to generate a feature data layer of the feature stack, wherein at least one of the feature extraction modules comprises a rotational invariant histogram of gradients (HOG) feature extraction module that is operative to generate feature data by:
        establishing a plurality of angular bins for an image in a gradient domain;
        histogramming gradients from the image with respect to the plurality of angular bins;
        selecting based on the histogramming the angular bin with the largest histogram value to define a primary direction;
        setting a plurality of pooling windows with relative offsets from a pixel of interest;
        defining a gradient orientation window encompassing the plurality of pooling windows;
        configuring the gradient orientation window to align the configuration of the gradient orientation window relative to the primary direction;
        shifting the positions of the pooling windows relative to the gradient orientation window based on the configuring; and
        rotating the internal orientation of the pooling windows based on the configuring.

2. The system of claim 1, wherein the classification compute module is operable to apply the classification model to the image data to classify pixels of the image data into the one or more classes.

3. The system of claim 2, wherein the classification compute module classifies pixels of the image data based on an analysis of the feature stack in relation to the classification model.

4. The system of claim 3, further comprising:
    a post classification analysis module operable to reclassify at least one pixel of the image data based on at least one post classification rule.

5. The system of claim 4, wherein the post classification rule comprises at least one of a minimum mapping unit rule, a surrounded by rule, a topological relation rule, a majority analysis rule, or a smoothing rule.

6. The system of claim 1, wherein the VHR remotely-sensed multispectral Earth image data comprises spectral band data corresponding to at least 8 multispectral bands.

7. The system of claim 6, wherein the multispectral bands collectively range from at least about 300 nanometers in wavelength to at least about 1100 nanometers in wavelength.

8. The system of claim 6, wherein the multispectral bands collectively range from at least about 300 nanometers in wavelength to at least about 2400 nanometers in wavelength.

9. The system of claim 8, wherein the multispectral bands comprise a plurality of short wave infrared (SWIR) bands.

10. The system of claim 9, wherein the plurality of SWIR bands range from at least about 1100 nanometers in wavelength to at least about 2400 nanometers in wavelength.

11. The system of claim 1, wherein the feature stack comprises a plurality of data layers, wherein each data layer includes different feature data for each pixel of the image data.

12. The system of claim 11, wherein the feature stack includes at least one spectral feature layer, at least one morphological feature layer, or at least one textural feature layer.

13. The system of claim 12, wherein the at least one spectral feature layer comprises data values for each pixel of the image data based on spectral band data collected by a remote image acquisition platform.

14. The system of claim 13, wherein the remote image acquisition platform comprises a satellite imaging system.

15. The system of claim 13, wherein at least one spectral feature layer comprises a relative measure between at least two spectral band data layers.

16. The system of claim 12, wherein the at least one morphological feature layer comprises for each given pixel of the image data information based on the arrangement of adjacent pixels relative to the given pixel.

17. The system of claim 12, wherein the textural feature layer comprises information for a given pixel based on a spatial distribution of tonal variations within one or more spectral band data layers relative to a given pixel.

18. The system of claim 1, wherein the client interface comprises an internet browser-based client operable to provide a user interface for receiving the training data from a user.

19. The system of claim 18, wherein the client interface comprises a plurality of distributed client interfaces operable to receive training data from a plurality of users, wherein the classification model is at least partially based on training data received from a plurality of users.

20. A land classification system operable for analysis of very high resolution (VHR) remotely-sensed multispectral Earth imagery, comprising:
 an image store containing image data corresponding to VHR remotely-sensed multispectral Earth images;
 at least one feature extraction module in operative communication with the image store, the feature extraction module being operable to produce feature data regarding at least a portion of image data;
 a feature stack comprising the image data and the feature data;
 a client interface operable to receive training data regarding at least one or more pixels of the image data from a user regarding at least one class to which the one or more pixels belong; a classification compute module operable to generate a classification model at least in part based on a portion of the feature stack corresponding to the one or more pixels and the training data, wherein the classification model relates to classification of pixels of image data into one or more classes; and
 a plurality of feature extraction modules each selectively applicable to image data by a user to generate a feature data layer of the feature stack, wherein at least one of the feature extraction modules comprises a fractal dimension feature extraction module that is operative to generate feature data by:
  identifying an image of a predetermined size of pixels;
  dividing the image into a plurality of abutting square windows having a side dimension less than the predetermined size of the image;
  constructing for each plurality of abutting square windows a column having a height as represented in increments of the side dimension of the abutting window, wherein the height is determined such that the ratio of the predetermined size of the image to the side dimension of the abutting windows equals the ratio of a maximum pixel value for a given multispectral band of the image to the height, wherein the squared side dimension and the height represent a plurality of boxes whose volume is defined by increments of the side dimension;
  determining, for each abutting window a box from the plurality of boxes in which a maximum pixel value and a minimum pixel value occur;
  calculating, for each of the plurality of abutting windows, the number of boxes separating the box in which the maximum pixel value is disposed and the box in which the minimum pixel value is disposed; and
  summing the number of boxes separating maximum and minimum pixel levels over all of the plurality of abutting windows to generate a summed value;
  repeating each of the constructing, determining, calculating, and summing operations for all possible values of the side dimension of the plurality of abutting windows such that each side dimension is less than or equal to half of the predetermined size of the image and at least greater than three pixels in length; and
  plotting each summed value generated in the repeating step to determine a slope of the summed values, wherein the slope comprises the fractal dimension of the image.

21. The system of claim 1, wherein at least one of the feature extraction modules comprises a total variational (TV) feature extraction module; and
 wherein the TV feature extraction module comprises a multispectral filtering module using a plurality of spectral bands of an image to generate a filtered image corresponding to the image.

22. The system of claim 1, wherein at least one of the feature extraction modules comprises a clustering histogram feature extraction module for extraction of features based on clustered and classified spectra values; and
 wherein the clustering histogram feature extraction module is operative to generate feature data by:
  assigning each pixel of an image into one of a plurality of a predefined classes;
  identifying a kernel surrounding each pixel containing a plurality of others pixels from the image, wherein each of the plurality of other pixels have been assigned into one of the plurality of predefined classes;
  building a histogram for each pixel based on the number of other pixels in each of the plurality of predefined classes relative to the pixel for which the histogram is built.

23. The system of claim 1, wherein the classification compute module is operable to utilize at least one machine learning algorithm to generate the classification model.

24. The system of claim 23, wherein the classification compute module is operable to utilize a plurality of machine learning algorithms to generate the classification model.

25. The system of claim 23, wherein a user is operable to specify at least one of a plurality of machine learning algorithms for use in generation of the classification model.

26. The system of claim 1, wherein the classification model comprises at least one model parameter corresponding to at least one of a geographic region or a temporal period.

27. The system of claim 26, wherein the classification computation module model is operable to determine the classification model for classification of image data based on the at least one model parameter and image data metadata.

28. The system of claim 1, wherein the one or more classes correspond to at least one of a land cover, a land use, or temperature.

29. The system of claim 1, further comprising:
a model evaluation module operable to provide quantifiable evaluation data regarding the classification module based on performance of the classification module with respect to a portion of training data received by a user.

30. The system of claim 29, wherein the model evaluation module is operable to generate a classifier accuracy value for the classification module.

31. The system of claim 30, wherein the model evaluation module is operable to generate at least one precision measurement for the classification module.

32. The system of claim 29, wherein the model evaluation module is operable to compare a first model to a second model to determine if the performance of the first model is statistically significant over the performance of the second model.

33. The system of claim 1, wherein the feature extraction module is operable to first produce feature information for pixels belonging to the training data prior to generation of the classification model by the classification compute model and is operable to second produce feature information for pixels other than the training data prior to application of the classification model to classify pixels other than the training data.

34. The system of claim 20, further comprising:
a post classification analysis module operable to reclassify at least one pixel of the image data based on at least one post classification rule, wherein the post classification rule comprises at least one of a minimum mapping unit rule, a surrounded by rule, a topological relation rule, a majority analysis rule, or a smoothing rule.

35. The system of claim 20, wherein the client interface comprises a plurality of distributed client interfaces comprising an internet browser-based client operable to receive training data from a plurality of users, and wherein the classification model is at least partially based on the training data received from the plurality of users.

36. The system of claim 20, wherein the classification model comprises at least one model parameter corresponding to at least one of a geographic region or a temporal period and the classification computation module model is operable to determine the classification model for classification of image data based on the at least one model parameter and image data metadata.

37. The system of claim 20, further comprising:
a model evaluation module operable to provide quantifiable evaluation data regarding the classification module based on performance of the classification module with respect to a portion of training data received by a user.

* * * * *